(12) United States Patent
Xiu et al.

(10) Patent No.: US 10,469,847 B2
(45) Date of Patent: Nov. 5, 2019

(54) INTER-COMPONENT DE-CORRELATION FOR VIDEO CODING

(71) Applicant: Vid Scale, Inc., Wilmington, DE (US)

(72) Inventors: Xiaoyu Xiu, San Diego, CA (US); Yan Ye, San Diego, CA (US); Yuwen He, San Diego, CA (US)

(73) Assignee: VID SCALE, Inc., Wilmington, DE (US)

(*) Notice: Subject to any disclaimer, the term of this patent is extended or adjusted under 35 U.S.C. 154(b) by 689 days.

(21) Appl. No.: 14/852,260

(22) Filed: Sep. 11, 2015

(65) Prior Publication Data

US 2016/0080751 A1 Mar. 17, 2016

Related U.S. Application Data

(60) Provisional application No. 62/171,542, filed on Jun. 5, 2015, provisional application No. 62/049,843, filed on Sep. 12, 2014.

(51) Int. Cl.
*H04N 19/186* (2014.01)
*H04N 19/124* (2014.01)
(Continued)

(52) U.S. Cl.
CPC ......... *H04N 19/186* (2014.11); *H04N 19/103* (2014.11); *H04N 19/124* (2014.11);
(Continued)

(58) Field of Classification Search
CPC .. H04N 19/103; H04N 19/124; H04N 19/157; H04N 19/176; H04N 19/186; H04N 19/436; H04N 19/70
(Continued)

(56) References Cited

U.S. PATENT DOCUMENTS

2015/0016512 A1* 1/2015 Pu .................. H04N 19/176
375/240.03
2015/0264402 A1* 9/2015 Zhang ................ H04N 19/126
375/240.18
(Continued)

FOREIGN PATENT DOCUMENTS

JP 2017-513315 A 5/2017
WO WO 2015/138954 A1 9/2015

OTHER PUBLICATIONS

Bivolarski et al., ",VP8 Encoder Technical Overview", Google Inc., Vienna, Austria, Jul. 2013, 36 pages.
(Continued)

*Primary Examiner* — Michael J Hess
*Assistant Examiner* — Naod W Belai
(74) *Attorney, Agent, or Firm* — Condo Roccia Koptiw LLP

(57) ABSTRACT

Cross-component prediction (CCP) and adaptive color transform (ACT) may be performed concurrently in a video coding system. CCP and ACT may be enabled/disabled at the same level (e.g. at the transform unit level) via an indicator signaled in the bitstream such as the ACT enable indicator for the CU. Inverse CCP and ACT may be operated at the same level (e.g. at the transform unit level). Prediction residuals may be converted to original color space without waiting for reconstruction of luma and chroma residuals of an entire prediction unit or coding unit. CCP and ACT transforms may be combined into one process to reduce encoding/decoding latency. Differences in dynamic ranges of color components may be compensated by variable dynamic range adjustments. Differences in bit depths between luma and chroma components may be compensated by selectively disabling the ACT coding tool, scaling a component output of the CCP, adjusting a quantization parameters (QPs) and/or shifting a component output of an inverse transform of the video coding system.

16 Claims, 18 Drawing Sheets

(51) Int. Cl.
*H04N 19/60* (2014.01)
*H04N 19/176* (2014.01)
*H04N 19/70* (2014.01)
*H04N 19/103* (2014.01)
*H04N 19/157* (2014.01)
*H04N 19/436* (2014.01)

(52) U.S. Cl.
CPC ......... *H04N 19/157* (2014.11); *H04N 19/176* (2014.11); *H04N 19/436* (2014.11); *H04N 19/60* (2014.11); *H04N 19/70* (2014.11)

(58) Field of Classification Search
USPC ...................................................... 375/240.02
See application file for complete search history.

(56) References Cited

U.S. PATENT DOCUMENTS

| | | | |
|---|---|---|---|
| 2015/0264405 A1* | 9/2015 | Zhang | H04N 19/126 375/240.18 |
| 2015/0373349 A1* | 12/2015 | Zhang | H04N 19/196 375/240.02 |

OTHER PUBLICATIONS

Bross et al., "High Efficiency Video Coding (HEVC) Text Specification Draft 10", JCTVC-L1003, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Chen et al., "Description of Screen Content Coding Technology Proposal by Qualcomm", Qualcomm Incorporated, Document: JCTVC-Q0031, Mar. 27-Apr. 4, 2014, pp. 1-19.
Dai et al., "RCE1: Adaptive Color Transforms For Range Extensions", FastVDO LLC, Document: JCTVC-M0048, WG11 Doc: m28481, Apr. 18-28, 2013, pp. 1-9.
HEVC, "HEVC Screen Content Coding Reference Software SCM-2.0", Available at: https://hevc.hhi.fraunhofer.de/svn/svn_HEVCSoftware/tags/HM-15.0+RExt-8.0+SCM-2.0/ , Retrieved on May 25, 2018, 1 page.
Bossen et al., "HM Software Manual", AHG chairs, Document: JCTVC-Software Manual, Joint Collaborative Team on Video Coding (JCT-VC) of ITU-T SG16 WP3 and ISO/IEC JTC1/SC29/WG11, Sep. 19, 2014, pp. 1-27.
ITU/ISO/IEC, "Joint Call for Proposals for Coding of Screen Content", ITU-T Q6/16 Visual Coding and ISO/IEC JTC1/SC29/WG11 Coding of Moving Pictures and Audio, ISO/IEC JTC1/SC29/WG11 MPEG2014/N14175, San Jose, USA, Jan. 2014, 16 pages.
ITUT-T, "Advanced Video Coding for Generic Audiovisual Services", ITU-T Rec H.264 and ISO/IEC/MPEG 4 part 10, Nov. 2007, 563 pages.
Tourapis et al. "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.
Joshi et al., "High Efficiency Video Coding (HEVC) Screen Content Coding: Draft 1", Document: JCTVC-R1005-v2, Jun. 30-Jul. 9, 2014, 360 pages.
Joshi et al., "High Efficiency Video Coding (HEVC) Screen Content Coding: Draft 1", Document: JCTVC-R1005, 18th Meeting: Sapporo, JP, Jun. 30-Jul. 9, 2014, 360 pages.
Kim et al., "Adaptive Residue Transform and Sampling", Samsung AIT, JVT-K018, Filename: JVT-K018r1.doc, Mar. 15-19, 2004, pp. 1-16.
Pu et al., "RCE1: Descriptions and Results for Experiments 1, 2, 3, and 4", Qualcomm Inc., Document: JCTVC-O0202, Joint Collaborative Team on Video Coding (JCT-VC) of ITU-T SG 16 WP 3 and ISO/IEC JTC 1/SC 29/WG 11, 15th Meeting: Geneva, CH, Oct. 25-Nov. 1, 2013, pp. 1-9.
SMPTE, "VC-1 Compressed Video Bitstream Format and Decoding Process", SMPTE 421M-2006, Feb. 24, 2006, 493 pages.
Xiu et al., "On Inter-Component De-Correlation for Screen Content Coding", InterDigital Communications, LLC, Document: JCTVC-S0179, Oct. 17-24, 2014, pp. 1-8.
Zhang et al., "SCCE5 Test 3.2.1: In-Loop Color-Space Transform", Qualcomm Incorporated, InterDigital Communications, LLC, Document: JCTVC-R0147, Jun. 30-Jul. 9, 2014, pp. 1-8.

* cited by examiner

INTER-COMPONENT DE-CORRELATION FOR VIDEO CODING

CROSS REFERENCE TO RELATED APPLICATIONS

This application claims the benefit of U.S. Provisional Patent Application No. 62/049,843, filed on Sep. 12, 2014, and U.S. Provisional Patent Application No. 62/171,542, filed on Jun. 5, 2015, the contents of which are hereby incorporated by reference herein.

BACKGROUND

Video coding systems are widely used to compress digital video signals to reduce storage requirements and/or transmission bandwidth. Different types of video coding systems include block-based, wavelet-based, object-based and block-based hybrid video coding systems. Block-based video coding systems may be based on international video coding standards, such as MPEG1/2/4 part 2, H.264/MPEG-4 part 10 Advanced Video Coding (MPEG-4 AVC), VC-1 and High Efficiency Video Coding (HEVC)/H.265 standards. Some block-based video coding systems may have complicated and/or inefficient architectural and operational implementations and may generate suboptimal coding.

SUMMARY

Cross-component prediction (CCP) and adaptive color transform (ACT) coding may be performed concurrently in a video coding system, e.g., HEVC. ACT may be adaptively enabled and/or disabled at the transform unit (TU) level. Multiple color spaces may be used to code the residuals of the TUs in a coding unit (CU). For example, some TUs in a CU may be coded in the original color space, and some TUs in the CU may be coded in the transformed color space.

A video coding device, such as a decoder, may determine whether to perform inverse ACT for a particular TU. The determination may be based on whether ACT is enabled for the TU. If ACT is enabled for the TU, the decoder may apply inverse ACT for the TU.

Whether ACT is enabled for a TU may be determined based on TU-level signaling. For example, whether ACT is enabled for a particular TU may be determined based on one or more conditions such as the prediction mode, the partition mode and the intra prediction mode associated with the CU or prediction unit (PU) that comprises the TU. For example, the TU level signaling may indicate whether inverse ACT is to be performed for a first TU and, separately indicates whether inverse ACT is to be performed for a second TU. It may be determined that ACT may be enabled/disabled for the TU on a condition that the prediction mode associated with the CU that comprises the TU is inter-prediction. It may be determined that ACT may be enabled/disabled for a TU on a condition that the partition mode is 2N×2N and the intra chroma prediction mode associated with the CU that comprises the TU is a predetermined value, such as 4. It may be determined that ACT may be enabled/disabled for a TU on a condition that the partition mode is N×N and the intra chroma prediction modes for the PUs that comprise the CU associated with the TU are of a predetermined value, such as 4. For the other cases, it may be determined that ACT is disabled.

Upon a determination that ACT is enabled for a TU, the decoder may identify a color space for decoding the residuals of the TU. The identification may be based on a TU color space indicator associated with the TU. The decoder may determine whether the residuals of the TU are coded in a transformed color space or an original color space based on the TU color space indicator associated with the TU, and decode the residuals of the TU based on the identified color space. The decoder may identify the color space used for decoding the TU residuals for each individual TU in the CU that have ACT enabled.

During de-quantization, multiple TU's may be processed via independent parallel processing paths. For example, a first parallel processing path may perform de-quantization, inverse transform, inverse CCP and, if indicated by TU level signaling for the first TU, inverse ACT for the first TU. A second and independent parallel processing path may perform de-quantization, inverse transform, inverse CCP, and if indicated by TU level signaling for the second TU, inverse ACT for the second TU. The two processing paths may be independent from each other and may be performed in parallel.

CCP and ACT coding tools may be enabled and disabled at the same level for lossy and lossless coding. Inverse CCP and inverse ACT may be operated at TU level regardless whether ACT enabling/disabling occurs at the TU level. The prediction residuals of a TU can be converted to the original color space without waiting for the reconstruction of the luma and chroma residuals of the entire PU or CU. Inverse CCP and inverse ACT transform may be performed in a combined decoding process. Performing inverse ACT at the TU level and the combined CCP and ACT decoding process can be applied with or without TU-level ACT enabling/disabling.

The allowed ranges of the weighting parameter for adaptive CCP may be dynamically adjusted. For example, the allowed ranges of weighting parameter $\alpha$ may be adjusted separately for the two chroma components when the CCP is enabled together with ACT. The allowed ranges of $\alpha_{C_g}$ and $\alpha_{C_o}$ may be adjusted to such that they have different ranges.

The quantization parameter (QP) values used in the YCgCo domain may be adjusted based on the selected CCP parameters. The adjustments may be made such that the distortion of the residual signal after inverse CCP and inverse color space transform are similar to distortion of the residual signal in YCgCo space.

ACT may be selectively disabled when bit depths of luma component and chroma components are different. Bit depths of luma and chroma components in a residual signal may be aligned by scaling a component of the residual signal, such as by applying a bit shift to a component output of CCP. The bit depths of the luma component and the chroma components may be aligned, e.g., by scaling the component with smaller/lower bit depth to match the bit depth of the other component through left bit shift before inverse color transform. For example, the bit depth of the luma component may be adjusted based on a bit depth difference between the bit depths of the luma component and the chroma components. For example, the bit depth of the chroma component may be adjusted based on a bit depth difference between the bit depths of the luma component and the chroma components. The scaled component may be readjusted and/or rescaled to its original bit depth through right bit shift after the inverse color transform.

A QP of a component of the residual signal may be adjusted. The scaled component may be readjusted and/or rescaled before output. For example, a bit shift may be applied to a component output of an inverse color transform of the video coding system.

An encoder may determine whether to enable ACT at the TU level for a given CU. The determination may be based on whether the residuals of the TUs in the CU have with very different statistical characteristics and/or the degree of difference. Upon a determination to enable and/or disable ACT at the TU level, the encoder may set the value of an ACT enable indicator to indicate that the residuals of the current CU may be coded in multiple color spaces. The encoder may determine a color space to code the residuals of a TU. For example, the encoder may select a color space for each TU in the CU. The encoder may set a TU color space indicator to indicate selected color space, and may encode the residuals of the TU in the selected color space.

A decoder may determine whether ACT is enabled and/or disabled at the TU level for a CU based on an indicator signaled in the bitstream. The indicator may include the ACT enable indicator for the CU. Upon a determination that ACT is disabled at the TU level, the decoder may identify a color space for decoding the residuals of the TUs in the CU based on a CU color space indicator associated with the CU.

These and other techniques may be implemented in hardware, software and/or firmware by a device, e.g. encoder, decoder, which may include a processor and computer readable storage medium.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
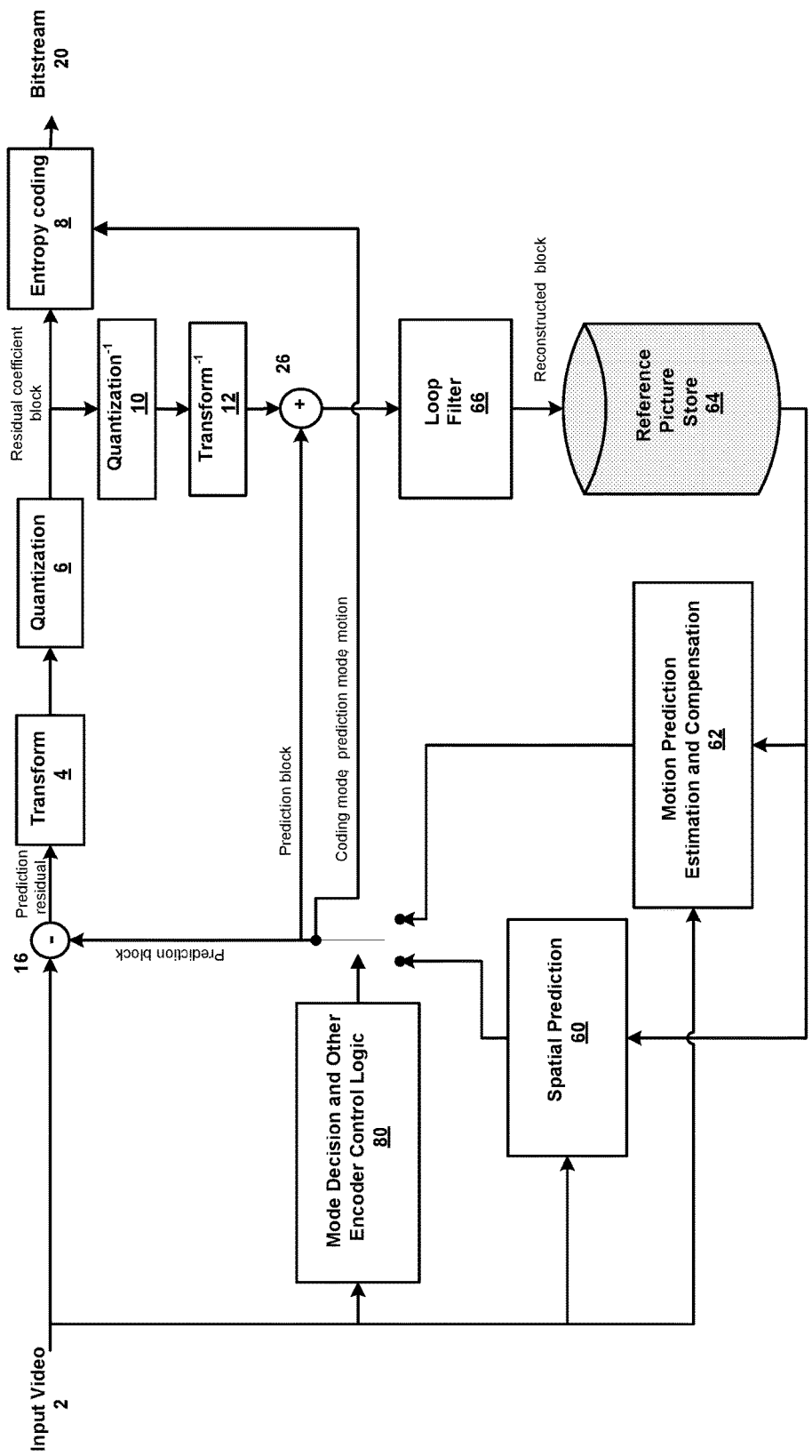
FIG. 1 shows an example block-based hybrid video encoding system.

FIG. 1 shows an example block-based hybrid video encoding system. As shown, input video signal 2 may be processed block by block. Blocks may be referred to as macro blocks (MBs). In High Efficiency Video Coding (HEVC), extended block sizes, referred to as coding units (CUs), may be used to compress video signals with high resolution, e.g., 1080 p and higher resolution. A CU may, for example, be 64×64 pixels. A CU may be further partitioned into prediction units (PUs), for which separate prediction methods are applied.

As shown in FIG. 1, an input video block (e.g., MB and/or CU) may be analyzed by spatial prediction 60 and/or motion/temporal prediction 62. Spatial prediction may reduce spatial redundancy inherent in input video signal 2. Temporal prediction may reduce temporal redundancy inherent in input video signal 2. Spatial prediction, referred to as intra prediction, uses pixels from already-coded neighboring blocks in the same video picture/slice, e.g., from reference picture store 64, to predict a current video block. Temporal prediction, referred to as inter prediction or motion compensated prediction, may use pixels from already coded video pictures, e.g., from reference picture store 64, to predict a current video block.

Temporal prediction for a given video block may be signaled by one or more motion vectors. Motion vectors may indicate a magnitude/amount and direction of motion between a current block and its reference block. When multiple reference pictures/blocks are supported, such as in MPEG-4 AVC or HEVC, a reference picture index may be provided for a video block to identify which reference picture, e.g., in reference picture store 64, was used to make the temporal prediction.

Mode decision block 80 may select a prediction mode (such as spatial or temporal) to determine the prediction block used in further processing. For example, the best prediction mode may be selected based on a rate-distortion optimization. A difference or residual may be generated by subtracting 16 the prediction block from the current video block. A prediction residual may be de-correlated by transform 4 and quantized by quantization 6 to achieve a target bit-rate. Quantized residual coefficient blocks may be inverse quantized 10 and inverse transformed 12 to generate a reconstructed residual. The reconstructed residual may be added 26 to the prediction block to form the reconstructed video block. Loop filter 66, e.g., de-blocking filter and Adaptive Loop Filters (ALFs), may be applied to the reconstructed video block. Reference picture store 64 may store the filtered (or unfiltered) reconstructed video block, which may be used to code future video blocks.

Coding mode (inter or intra), prediction mode information, motion information and quantized residual coefficient blocks may be provided to entropy coding unit 8. Entropy coding unit 8 may provide additional compression to generate output video bitstream 20.

Figure 2:
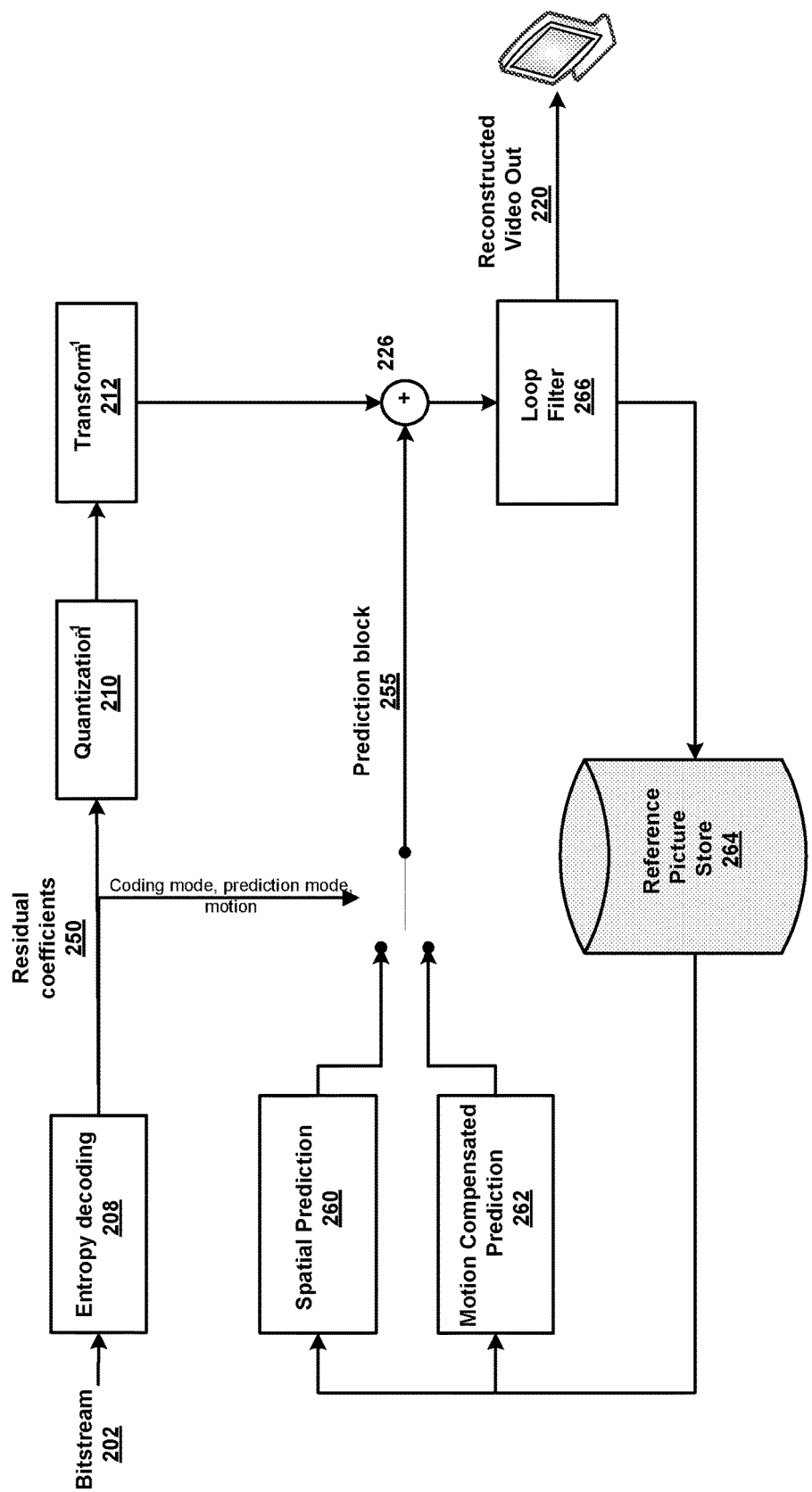
FIG. 2 shows an example block-based video decoder.

FIG. 2 shows an example block-based video decoder. Decoding 208 may receive, unpack and entropy decode video bitstream 202. Decoding 208 may generate residual coefficients. The prediction block 255 may be generated based on encoding of bitstream 202. If bitstream 202 is intra coded, coding mode and prediction information may be provided to spatial prediction unit 260. If bitstream 202 is inter coded, coding mode and prediction information may be provided to temporal prediction unit 262. The residual transform coefficients may be provided to inverse quantization unit 210 and inverse transform unit 212 to reconstruct the residual block. The reconstructed block may be generated by adding 226 the prediction block 255 to the residual block. The reconstructed block may be filtered by loop filter 266. The filtered (or unfiltered) reconstructed block may be stored in reference picture store 264. The reconstructed video in reference picture store 264 may be utilized by spatial prediction 260 and motion compensated prediction 262 to generate prediction blocks 255. The reconstructed video in reference picture store 264 may be provided to a display device.

The efficiency and quality of coding/decoding provided by HEVC and other block-based video coding systems may vary with content. Natural video, e.g., captured by cameras, may have substantially different properties than computer-generated or screen content. The coding efficiency of HEVC for natural video is substantially better than coding efficiency for screen content video, which is typically composed of computer-generated content, such as text and graphics.

Screen content videos may be captured in 4:4:4 chroma format, where the three color components (such as the luma component and both chroma components) have the same resolution. Although 4:4:4 chroma format is less efficient because it results in more redundancies than 4:2:0 chroma format and 4:2:2 chroma format, 4:4:4 chroma format may be preferred by some screen content applications where high fidelity may be desirable to preserve color information, such as sharp edges, in the decoded screen content video.

For example, correlations among the three color components of 4:4:4 chroma format video, e.g., Y, Cb and Cr in YCbCr domain, and G, B and R in RGB domain may be exploited.

With regard to screen content coding in HEVC, coding tools, such as cross-component prediction (CCP) and adaptive color transform (ACT), may be employed to exploit correlation among three color components in 4:4:4 chroma format video. For example, both ACT and CCP may operate in the residual domain. CCP may be used to predict chroma residuals from luma residuals. In RGB space, the residual of G component may be used to predict the residuals of B and R and, and in the YCbCr space, the residual of Y component may be used to predict the residuals of Cb and Cr component. In ACT, the residuals of three components may be converted from one color space to another color space to reduce the correlation (e.g. redundancy) among the three components.

Figure 3:
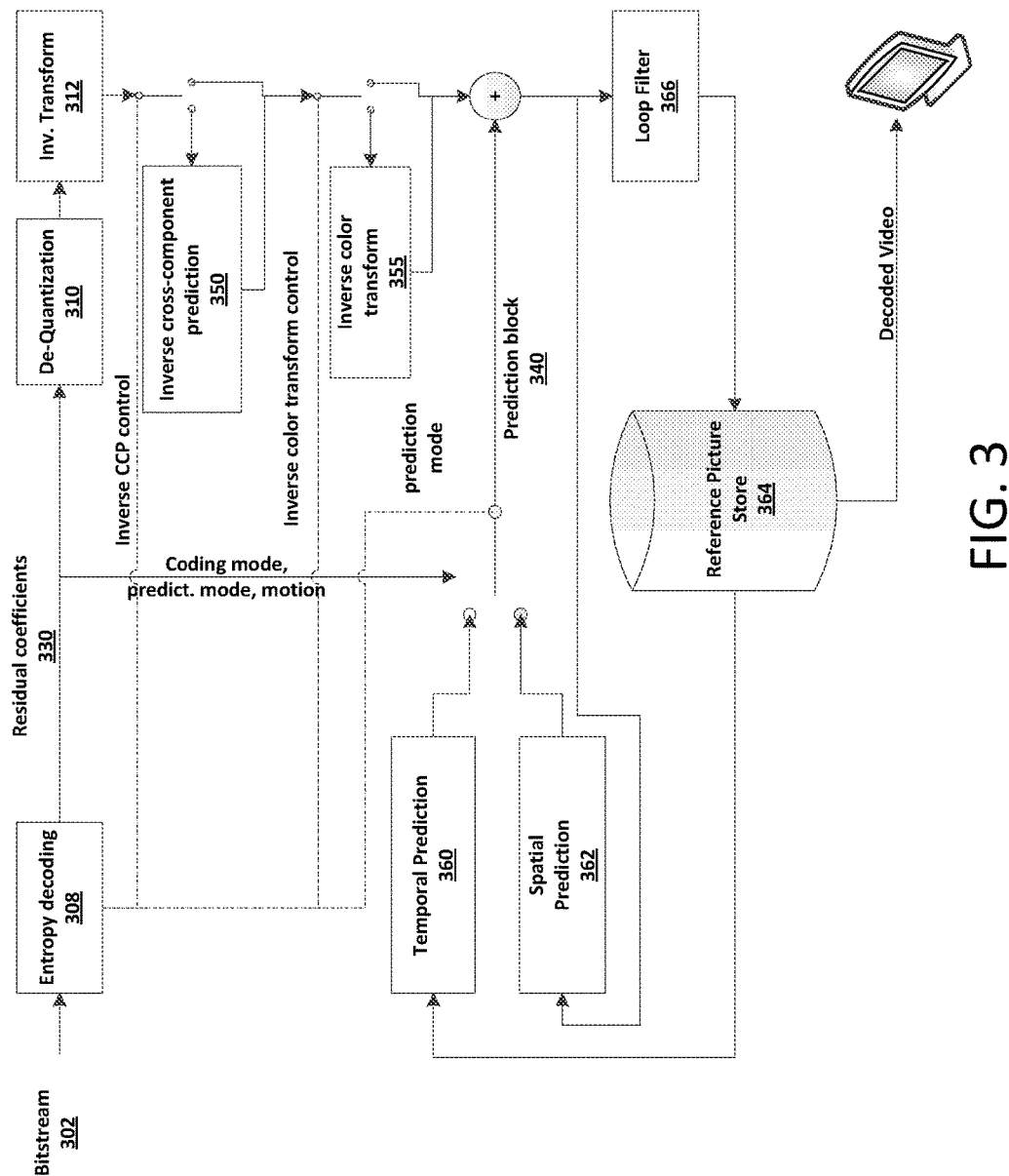
FIG. 3 shows an example block-based video decoder with inverse CCP and inverse ACT.

FIG. 3 shows an example block-based video decoder with inverse CCP and inverse ACT. Cross-component de-correlation in decoding may remove redundancies among three color components of 4:4:4 chroma format video. As shown in FIG. 3, the residual decoding process may include inverse CCP 350 and inverse color transform 355, e.g., inverse ACT. The bitstream 302 may be decoded at entropy decoding 308. Control signals, e.g., inverse CCP control and inverse color transform control may be provided to select inverse CCP 350 and/or inverse color transform 355 to apply inverse CCP and/or inverse ACT transforms.

Residual coefficients 330 provided by entropy decoding 308 may be processed by de-quantization 310 and inverse transform 312 to reconstruct the residual block. Depending on control signals, inverse CCP 350 and/or inverse color transform 355 may be applied to a transform unit (TU) of the residual block. If inverse CCP is selected, the residual coefficients 330 of the TU may be provided to the inverse CCP 350. The residuals of one chroma component (B and R components in GBR video format) may be predicted from the residuals of the luma component (G component in GBR video format). If inverse ACT is selected for a CU or PU, residual coefficients 330 of the CU or PU may be converted back to the original color space by the inverse color transform 355.

The reconstructed block may be filtered by loop filter 366. The filtered (or unfiltered) reconstructed block may be stored in reference picture store 364. The reconstructed video in reference picture store 364 may be utilized by spatial prediction 362 and/or temporal prediction 360 to generate prediction blocks 340. The reconstructed video in reference picture store 364 may be provided to a display device.

The inverse CCP 350 and inverse color transforms 355 may be two separate decoding processes operated at different levels. For example, inverse CCP 350 may operate at the TU level, and inverse color transform 355 may operate at the CU level or at the PU level. For example, the inverse CCP 350 may be a TU-level operation, and the inverse color transform may be a CU-level/PU-level operation.

While coding of 4:4:4 video may be used as an example to describe the embodiments herein, techniques described herein are applicable to a variety of coding techniques operable with a variety of formats.

An adaptive cross-component prediction may be applicable to one or more block-based coding systems, e.g., HEVC. A prediction may be performed between luma residual and/or chroma residual. The predictor may be generated using simple operations including a multiplication and a bit-shift. The chroma residual may be predicted using the luma residual at the encoder side according to Eq. 1.

$$\Delta r_C(x,y) = r_C(x,y) - \alpha \times r'_L(x,y) \qquad \text{Eq. 1}$$

At the decoder side, the chroma residual may be compensated from the luma residual according to Eq. 2.

$$r'_C(x,y) = \Delta r'_C(x,y) + \alpha \times r'_L(x,y) \qquad \text{Eq. 2}$$

In Eq. 1 and 2, $r_C$ denotes the original chroma residual sample at a position (x,y); $r'_L$ denotes the reconstructed residual sample of the luma component; $\Delta r_C$ denotes the predicted signal after prediction; $\Delta r'_C$ denotes the reconstructed chroma residual after coding and decoding (e.g., transform and/or quantization followed by inverse transform and/or inverse quantization) $\Delta r_C$; $r'_C$ denotes the reconstructed chroma residual signal; α is weighting parameter that is a real-valued number.

Given that α may be derived as a coefficient with floating-point precision, it may be quantized before transmission from encoder to decoder. In an example CCP encoder, a non-uniform quantization method may be utilized to quantize the absolute value of α.

Figure 4A:
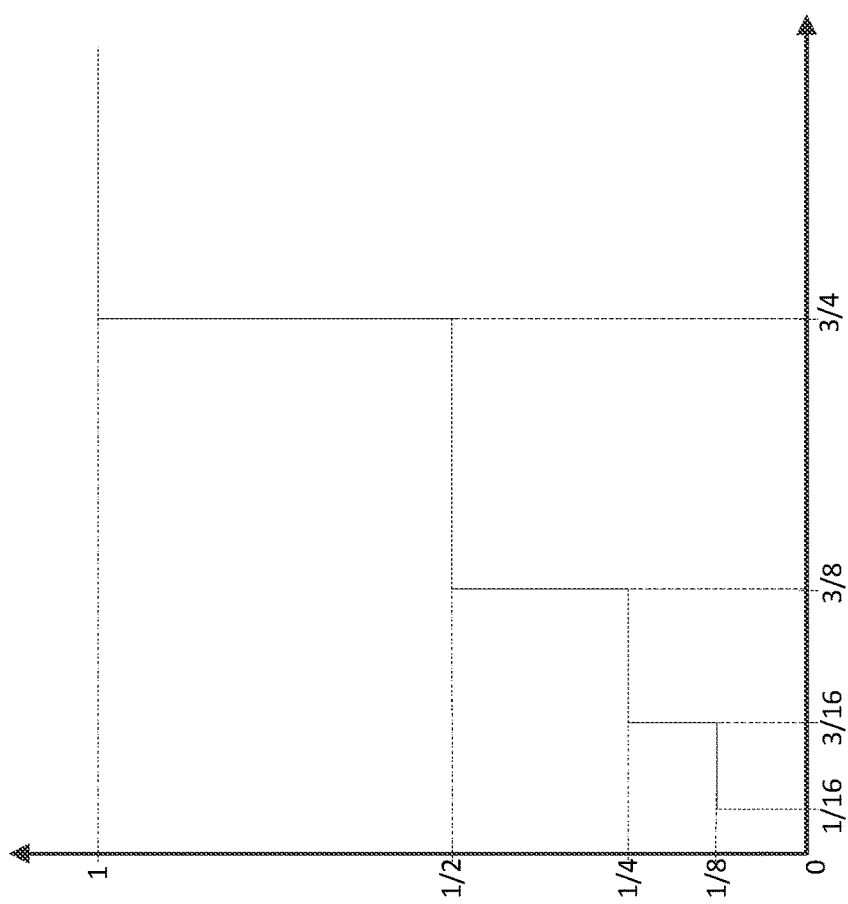
FIG. 4A illustrates an example non-uniform quantization of the CCP parameters.

FIG. 4A illustrates an example non-uniform quantization of the CCP parameter(s). As shown in FIG. 4A, the absolute value of α (α could be either positive or negative) is quantized into a set of pre-defined values {0, ⅛, ¼, ½, 1}.

Table 1 shows exemplary mapping between the original α values and the reconstruction value using an example quantization process.

TABLE 1

Mapping original α value to reconstruction value for example quantization process

| Original value range | Reconstruction value | Original value range | Reconstruction value |
|---|---|---|---|
| (−∞, −3/4] | −1 | [3/4, +∞) | 1 |
| (−3/4, −3/8] | −1/2 | [3/8, 3/4) | 1/2 |
| (−3/8, −3/16] | −1/4 | [3/16, 3/8) | 1/4 |
| (−3/16, −1/16] | −1/8 | [1/16, 3/16) | 1/8 |
| (−1/16, 1/16) | 0 | | |

When using integer arithmetic, pre-defined real values may be approximated by multiplying an integer scaling β and 3-bit right shift. Correspondingly, Eq. 1 and 2 may become, respectively, Eq. 3 and 4.

$$\Delta r_C(x,y) = r_C(x,y) - (\beta \times r'_L(x,y)) >> 3 \quad \text{Eq. 3}$$

$$r'_C(x,y) = \Delta r'_C(x,y) + (\beta \times r'_L(x,y)) >> 3 \quad \text{Eq. 4}$$

In Eq. 3 and 4, β is chosen from {−8, −4, −2, −1, 0, 1, 2, 4, 8}. If the bit depths of the luma component and chroma component are different, the magnitude of the luma residual may be scaled to match that of the chroma residual before being used as predictor.

An in-loop adaptive color space transform may be performed to adaptively transform the residuals from one color space into YCgCo space such that the correlation (e.g., redundancy) between three color components may be reduced. A color space conversion into YCgCo may be adaptively applied at CU level. Different color space transforms may be applied depending whether the CU is coded in lossless mode or in lossy mode. For example, the forward and inverse color space transforms for lossy mode may be the irreversible version of YCgCo transform according to Eq. 5.

$$\begin{bmatrix} Y \\ C_g \\ C_o \end{bmatrix} = \begin{bmatrix} 2 & 1 & 1 \\ 2 & -1 & -1 \\ 0 & -2 & 2 \end{bmatrix} \begin{bmatrix} G \\ B \\ R \end{bmatrix} / 4 \quad \text{Eq. 5}$$

$$\begin{bmatrix} G \\ B \\ R \end{bmatrix} = \begin{bmatrix} 1 & 1 & 0 \\ 1 & -1 & -1 \\ 1 & -1 & 1 \end{bmatrix} \begin{bmatrix} Y \\ C_g \\ C_o \end{bmatrix}$$

Figure 4B:
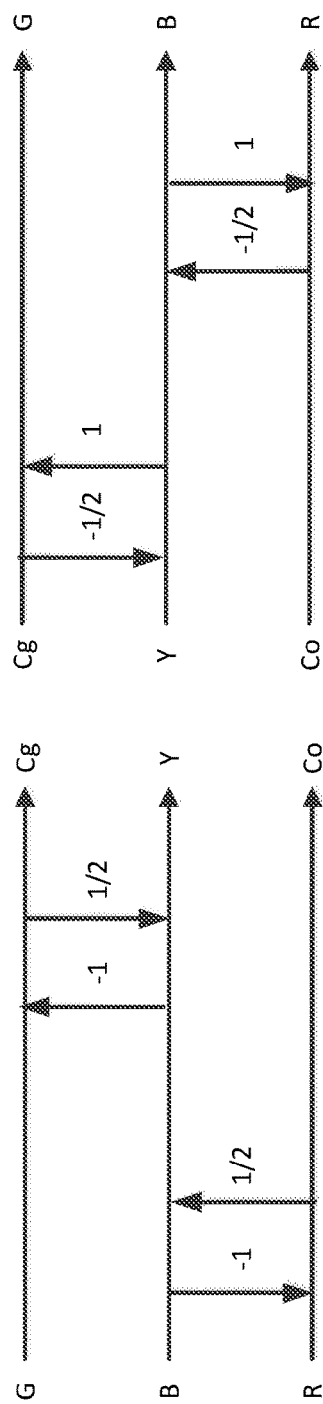
FIG. 4B illustrates example lifting operations for the reversible version of YCgCo transforms.

For lossless mode, the reversible version of YCgCo transforms may be performed. The transforms may be implemented based on lifting operations as depicted as below in Eq. 6 shown in FIG. 4B.

As shown in Eq. 5, the forward and inverse color transform matrices used in lossy mode may not be normalized. The magnitude of the YCgCo signal may be smaller in comparison to that of original signal after the color transform is applied. To compensate the decrease in magnitude caused by the forward color transform, an adjusted quantization parameter may be applied to the residuals in YCgCo domain. For example, the QP values $QP_Y$, $QP_{Cg}$ and $QP_{Co}$, may be used to quantize the YCgCo domain residuals. When the color space transform is applied, the QP values $QP_Y$, $QP_{Cg}$ and $QP_{Co}$ may be set to QP—5, QP—5 and QP—3 respectively. QP may be the quantization parameter used in the original color space.

ACT and CCP may be enabled or disabled at different levels. Assume the ACT tool is enabled/disabled at the CU level, and the transform coding of prediction residuals may be applied at the TU level. The residuals of one CU could be partitioned into multiple TUs based on the quad-tree structure. The residuals of a TU could have different characteristics from the residuals of neighboring TUs in the same CU. The TUs in a CU may use the same ACT decision (e.g., to enable or disable at the CU level).

ACT and CCP may be enabled or disabled at the same level. For example, the enabling/disabling of the ACT may be at the TU level.

An ACT signaling flag, e.g., cu_ycgco_coding_flag, may indicate whether the color space transform is applied. The ACT signaling flag may be signaled at the CU level to indicate whether the color space transform is applied to a corresponding CU, such as the current CU. For example, cu_ycgco_coding_flag having a value of 1 may indicate that the residuals of the corresponding CU are encoded/decoded in YCgCo space. The cu_ycgco_coding_flag having a value of 0 may indicate that the residuals of the CU are encoded/decoded in the original color space. For intra block copy (IBC) mode and inter mode, such a flag may be signaled when there is at least one non-zero coefficient in the current CU.

In transform coding of the prediction residual, the residual block may be partitioned into multiple square TUs. The possible TU sizes may include 4×4, 8×8, 16×16 and 32×32. Depending on the video characteristics and the selected coding modes, neighboring TUs in a CU could possibly have residual signals with very different statistical characteristics. ACT may be adaptively enabled and/or disabled at the TU level. Multiple color spaces may be used to code the residuals of the TUs in a CU. Different TUs in a CU may be coded in different color spaces.

An encoder may determine whether to enable and/or disable ACT at the TU level for a CU. The determination may be based on whether the residuals of the TUs in the CU have very different statistical characteristics (e.g., based on the degree of difference). Upon a determination to enable ACT at the TU level, the encoder may set the value of an ACT enable indicator to indicate that the current CU (e.g., the residuals of the current CU) may be coded in multiple color spaces. Upon a determination to disable ACT at the TU level, the encoder may set the value of an ACT enable indicator to indicate that the current CU is coded in a single color space, and may set an indicator to indicate the color space. A decoder may determine whether ACT is enabled and/or disabled at the TU level for a CU. The determination may be based on a signaled indicator such as the ACT enable indicator for the CU. Upon a determination that ACT is disabled at the TU level, the decoder may identify a color space for decoding the residuals of the TUs in the CU based on a CU color space indicator associated with the CU.

Table 2 shows a non-limiting example of coding unit syntax. As shown in Table 2, an indicator, such as an ACT enable indicator may be signaled at the CU level. The indicator may indicate whether the selection between color spaces (or among multiple color spaces) may be carried out for the TUs in the corresponding CU. The indicator may include a tu_act_enabled_flag. For example, if tu_act_enabled_flag is set to 0, it may indicate that the residuals of the current CU are coded in one color space. The color space may be indicated via a CU color space indicator such as the cu_ycgco_coding_flag shown in Table 2. If tu_act_enabled_flag is set to 1, it may indicate that the TUs in the current CU may have the flexibility to select between two color spaces (or among multiple color spaces such as the original color space and the transformed color space) for coding its own residuals.

al_act_flag is equal to 1 and if tu_act_enabled_flag is equal to 1, then cu_ycgco_residual_flag may not present. The color space in which the residuals are coded may not be specified by cu_ycgco_residual_flag. The color space in which the residuals are coded may be specified by tu_ycgco_residual_flag.

Upon a determination to enable ACT at the TU level, the encoder may determine a color space to code the residuals of a TU. For example, the encoder may select a color space for each TU in the CU. The encoder may set a TU color space indicator to indicate selected color space, and may encode the residuals of the TU in the selected color space.

Upon a determination that ACT is enabled at the TU level, the decoder may identify a color space for decoding the residuals of a TU in the CU based on a TU color space indicator associated with the TU. In an embodiment, the

TABLE 2

| Coding unit syntax | |
|---|---|
| coding_unit( x0, y0, log2CbSize ) { | Descriptor |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   ... | |
|   if( !pcm_flag[ x0 ][ y0 ] ) { | |
|     if( CuPredMode[ x0 ][ y0 ] != MODE_INTRA && | |
|     !( PartMode = = PART_2Nx2N && merge_flag[ x0 ][ y0 ] ) | | | |
|     CuPredMode[ x0 ][ y0 ] = = MODE_INTRA && intra_bc_flag[ x0 ][ y0 ] ) | |
|     rqt_root_cbf | ae(v) |
|     if( rqt_root_cbf ) { | |
|       if( sps_residual_act_flag ) { | |
|         tu_act_enabled_flag | ae(v) |
|         if( !tu_act_enabled_flag ) | |
|           cu_ycgco_residual_flag | ae(v) |
|       } | |
|       MaxTrafoDepth = ( CuPredMode[ x0 ][ y0 ] = = MODE_INTRA ? | |
|         ( max_transform_hierarchy_depth_intra + IntraSplitFlag ) : | |
|         max_transform_hierarchy_depth_inter ) | |
|       transform_tree( x0, y0, x0, y0, log2CbSize, 0, 0 ) | |
|     } | |
|   } | |
|   } | |
| } | |

For example, tu_act_enabled_flag equal to 1 may indicate that the residuals of the TUs in the current CU may be coded in different color spaces. When tu_act_enabled_flag is equal to 0, it may indicate that the residual of the coding unit is coded in one color space, as specified by cu_ycgco_residual_flag.

For example, cu_ycgco_residual_flag equal to 1 may indicate that the residuals of the CU may be coded in the YCgCo color space. When cu_ycgco_residual_flag is equal to 0, it may indicate that the residuals of the coding unit may be coded in the original color space.

If sps_residual_act_flag is equal to 0, cu_ycgco_residual_flag may not be present. The decoder may infer the value of the sps_residual_act_flag be equal to 0. If sps_residudecoder may identify the color space used for encoding the TU residuals for each individual TU in the CU. The decoder may decode the residuals of the TU based on the identified color space for that TU.

Table 3 shows a non-limiting example of transform unit syntax. As shown in Table 3, a flag such as the tu_ycgco_coding_flag may be included in transform_unit( ) to specify the color space chosen for a corresponding TU. The flag may be signaled in bit-stream when there is at least one non-zero coefficient for that TU. In an embodiment, the flag may be skipped in bit-stream when there the coefficient(s) for the TU are zero.

TABLE 3

| Transform unit syntax | |
|---|---|
| transform_unit( x0, y0, xBase, yBase, log2TrafoSize, trafoDepth, blkIdx ) { | Descriptor |
|   log2TrafoSizeC = log2TrafoSize - ( ChromaArrayType = =3 ? 0 : 1 ) | |
|   cbfLuma = cbf_luma[ x0 ][ y0 ][ trafoDepth ] | |
|   cbfChroma =     cbf_cb[ x0 ][ y0 ][ trafoDepth ] | | | |
|               cbf_cr[ x0 ][ y0 ][ trafoDepth ] | | | |

TABLE 3-continued

Transform unit syntax

```
( ChromaArrayType = = 2 &&
    ( cbf_cb[ x0 ][ y0 + ( 1 << log2TrafoSizeC ) ][ trafoDepth ] | |
    cbf_cr[ x0 ][ y0 + ( 1 << log2TrafoSizeC ) ][ trafoDepth ] ) )
    ...
    if( sps_residual_act_flag && tu_act_enabled_flag && (cbfLuma || cbfChroma) )
        tu_ycgco_residual_flag                                                        ae(v)
        residual_coding( x0, y0, log2TrafoSize, 0 )
    if( log2TrafoSize > 2 | | ChromaArrayType = = 3 ) {
        if( cross_component_prediction_enabled_flag && cbfLuma &&
            ( CuPredMode[ x0 ][ y0 ] = = MODE_INTER | | intra_bc_flag[ x0 ][ y0 ] | |
            intra_chroma_pred_mode[ x0 ][ y0 ] = = 4 ) )
            cross_comp_pred( x0, y0, 0 )
        for( tIdx = 0; tIdx < ( ChromaArrayType = = 2 ? 2 : 1); tIdx++ )
            if( cbf_cb[ x0 ][ y0 + (tIdx << log2TrafoSizeC ) ][ trafoDepth ] )
                residual_coding( x0, y0 + ( tIdx << log2TrafoSizeC ), log2TrafoSizeC, 1 )
        if( cross_component_prediction_enabledflag && cbfLuma &&
            ( CuPredMode[ x0 ][ y0 ] = = MODE_INTER | | intra_bc_flag[ x0 ][ y0 ] | |
            intra_chroma_pred_mode[ x0 ][ y0 ] = = 4 ) )
            cross_comp_pred( x0, y0, 1 )
        for( tIdx = 0; tIdx < ( ChromaArrayType = = 2 ? 2 : 1); tIdx++ )
            if( cbf_cr[ x0 ][ y0 + (tIdx << log2TrafoSizeC ) ][ trafoDepth ] )
                residual_coding( x0, y0 + ( tIdx << log2TrafoSizeC ), log2TrafoSizeC, 2 )
    } else if( blkIdx = = 3 ) {
        for( tIdx = 0; tIdx < ( ChromaArrayType == 2 ? 2 : 1); tIdx++)
            if( cbf_cb[ xBase ][ yBase + (tIdx << log2TrafoSizeC ) ][ trafoDepth ] )
                residual_coding( xBase, yBase + (tIdx << log2TrafoSize ), log2TrafoSize, 1 )
        for( tIdx = 0; tIdx < ( ChromaArrayType = = 2 ? 2 : 1); tIdx++ )
            if( cbf_cr[ xBase ][ yBase + (tIdx << log2TrafoSizeC ) ][ trafoDepth ] )
                residual_coding( xBase, yBase + (tIdx << log2TrafoSize ), log2TrafoSize, 2 )
        }
    }
}
```

As shown in Table 3, an indicator, such as tu_ycgco_residual_flag may indicate whether the residuals of the transform are coded in the YCgCo color space. For example, the tu_ycgco_residual_flag equal to 1 may indicate that the residuals of the transform unit are coded in the YCgCo color space. When tu_ycgco_residual_flag is equal to 0, it may indicate that the residuals of the transform unit are coded in original color space. When tu_ycgco_residual_flag is not present, it may be inferred to be equal to 0.

An indicator, such as the flag tu_act_enabled_flag, may be signaled to indicate whether ACT is enabled or disabled. The indicator may be signaled on the CU-level, the TU-level, and/or another level. For example, if the indicator indicates that ACT is disabled on a TU level (e.g., the flag is equal to 0), the residuals of the current CU may be coded in the same color space (e.g., as indicated by the flag cu_ycgco_residual_flag). If the indicator indicates that ACT is enabled on a TU level (e.g., the flag is equal to 1), an individual TU in the CU may be allowed to select its own color space for coding the residuals. The residuals of the TUs in a same CU may be coded in different color spaces.

Whether ACT is enabled for a TU may be determined based on TU-level signaling. The TU level signaling may indicate whether inverse ACT is to be performed for a first TU and, separately indicates whether inverse ACT is to be performed for a second TU. For example, whether ACT is enabled for a particular TU may be determined based on one or more conditions such as the prediction mode, the partition mode and the intra prediction mode associated with the CU or prediction unit (PU) that comprises the TU. Table 3-1 shows a non-limiting example transform unit syntax table.

As shown in Table 3-1, it may be determined that ACT can be enabled/disabled for the TU on a condition that the prediction mode associated with the CU that comprises the TU is inter-prediction. It may be determined that ACT can be enabled/disabled for a TU on a condition that the partition mode is 2N×2N and the intra chroma prediction mode associated with the CU that comprises the TU is a predetermined value, such as 4. It may be determined that ACT can be enabled/disabled for a TU on a condition that the partition mode is N×N and the intra chroma prediction modes for the PUs that comprise the CU associated with the TU are of a predetermined value, such as 4. In an embodiment, for the other cases, it may be determined that ACT is disabled.

TABLE 3-1 transform unit syntax using the proposed TU-level ACT flag

```
transform_unit( x0, y0, xBase, yBase, log2TrafoSize, trafoDepth, blkIdx )   Descriptor
{
    ......
    if( cbfLuma | | cbfChroma ) {
        ......
        xP = ( x0 >> MinCbLog2SizeY ) << MinCbLog2SizeY
        yP = ( y0 >> MinCbLog2SizeY ) << MinCbLog2SizeY
        nCbS = 1 << MinCbLog2SizeY
        if( residual_adaptive_colour_transform_enabled_flag &&
```

TABLE 3-1-continued transform unit syntax using the proposed TU-level ACT flag

```
            ( CuPredMode[ x0 ][ y0 ] = = MODE_INTER | |
            ( PartMode = = PART_2Nx2N &&
              intra_chroma_pred_mode[ x0 ][ y0 ] = = 4) | |
              ( intra_chroma_pred_mode[ xP ][ yP ] = = 4 &&
              intra_chroma_pred_mode[ xP + nCbS/2 ][ yP ] = = 4 &&
              intra_chroma_pred_mode[ xP ][ yP + nCbS/2 ] = = 4 &&
              intra_chroma_pred_mode[ xP + nCbS/2 ][ yP + nCbS/2 ] = = 4 )
) )
            tu_ycgco_residual_flag                                        ae(v)
        if( cbfLuma )
            residual_coding( x0, y0, log2TrafoSize, 0 )
                ......
    }
}
```

Upon a determination that ACT is enabled for a TU, the decoder may identify a color space for decoding the residuals of the TU. The identification may be based on a TU color space indicator associated with the TU. The decoder may determine whether the residuals of the TU are coded in a transformed color space or an original color space based on the TU color space indicator associated with the TU, and decode the residuals of the TU based on the identified color space. The decoder may identify the color space used for decoding the TU residuals for each individual TU in the CU that have ACT enabled.

As shown in Table 3-1, an indicator, such as tu_ycgco_residual_flag may indicate whether the residuals of the transform are coded in YCgCo color space. For example, the tu_ycgco_residual_flag equal to 1 may indicate that the residuals of the TU are coded in YCgCo color space. In an embodiment, the indicator tu_ycgco_residual_flag equal to 1 may indicate that ACT can be enabled or disabled for the TU. When tu_ycgco_residual_flag is equal to 0, it may indicate that the residuals of the TU are coded in original color space. When tu_ycgco_residual_flag is not present, it may be inferred to be equal to 0.

For example, an indicator, such as the flag tu_ycgco_coding_flag, may be signaled in transform unit syntax table such that color spaces may be adaptively selected for the TUs. For example, a color space may be selected for each TU. The flag may be signaled. The flag may be skipped when the coded block flag (CBF) indicates that the coefficients in one TU are zero or there are one or more PUs in one intra-coded CU not using DM mode.

A color space may be selected for a CU. For example, upon a determination to disable ACT at the TU level, the encoder may select a color space based on the rate-distortion (R-D) performance of the transformed color space and the original color space. The encoder may test rate-distortion (R-D) performance of the transformed color space and the original color space. One or more encoding speed-up processes may be applied to reduce the number of tested color spaces for some coding cases. For example, whether the residuals of the TUs in a CU may be coded in the transformed color space or the original color space may be determined at the CU-level. R-D performance may be tested by using different color spaces to code the residuals of the TUs in a CU.

For illustration purposes, the term "CU-level ACT on" and "CU-level ACT off" may refer to coding the residuals of the TUs in a CU in the transformed color space (e.g., enabling ACT) and the original color space (e.g., disabling ACT) respectively; the term "TU-level ACT" may refer to selecting color space(s) for coding the residuals of the TUs separately (e.g., each TU in a CU has the freedom to select its own color space); in addition, "CU-level ACT" may refer to "CU-level ACT on" or "CU-level ACT off" herein.

For example, the R-D cost of TU-level ACT may be determined. For example, the R-D cost of CU-level ACT may be calculated. In a non-limiting example, the R-D cost of TU-level ACT may be checked before the R-D cost of CU-level ACT is checked. The selection of the color space to be tested for the CU-level ACT may be dependent on the color format of the input video. For RGB sequences, CU-level on may be tested. For YUV sequences, CU-level off may be tested. The R-D performance checking of CU-level ACT may be performed on a condition that there is at least one non-zero coefficient for TU-level ACT.

Coding parameters may be determined. In an embodiment, the same coding parameters may be used for TU-level ACT, CU-level ACT and/or ACT on another level. For example, for intra mode, intra prediction directions of luma and chroma components may be shared by TU-level ACT and CU-level ACT. For example, for inter mode, motion information (e.g., motion vectors, reference picture indices and motion vector predictors) may be shared by TU-level ACT and CU-level ACT.

CUs with large size (e.g., 64×64 and 32×32) may often be selected to code flat areas in a picture that are more likely to select one specific color space for residual coding. Areas covered by small CUs are more likely to contain rich textures that may have diverse characteristics. For intra mode, the TU-level ACT may be examined for 8×8 CUs of RGB sequences and 16×16 and 8×8 CUs of YUV sequences. In an embodiment, the TU-level ACT may only be examined for 8×8 CUs of RGB sequences, and 16×16 and 8×8 CUs of YUV sequences for intra mode. For IBC mode, the TU-level ACT may be examined for 16×16 and 8×8 CUs. In an embodiment, the TU-level ACT may only be examined for 16×16 and 8×8 CUs for IBC mode. For inter mode, the TU-level ACT may be examined for 8×8 CUs. In an embodiment, the TU-level ACT may only be examined for 8×8 CUs for inter mode.

The color space for a child TU can be selected based on the color space of its parent TU. For example, the color space for a child TU can be derived from the color space of its parent TU. For RGB sequences, the calculation of the R-D cost in RGB domain may be skipped for a TU if the residuals of its parent TU are coded in YUV space. For YUV sequences, the calculation of the R-D cost in YUV domain may be skipped for a TU on a condition that the residuals of its parent TU are coded in RGB space.

Coded pictures may be classified into different temporal layers (TL). Pictures at lower TLs can be coded with better video quality. Pictures at higher TLs may take up a higher proportion of the whole video sequence than pictures at lower TLs. The R-D process of TU-level ACT may be skipped depending on the encoding configuration and/or the TL level of the coded picture. For example, for random access (RA) configuration, the TU-level ACT for intra mode and IBC mode may not be examined for TL-3 pictures for RGB sequences. For example, the examination of the TU-level ACT for inter mode may be skipped for TL-0 pictures for RGB and YUV sequences. For example, for low delay (LD) configuration, the examination of the TU-level ACT for intra mode and IBC mode may be skipped for TL-0 and TL-1 pictures for RGB sequences. For example, the examination of TU-level ACT for inter mode may be skipped for TL-0 pictures for RGB and TL-0 and TL-2 pictures for YUV sequences. For example, when lossless coding is applied, TU-level ACT may be disabled for intra and IBC mode.

Inverse CCP and inverse ACT may be performed at different levels. An ACT decoding process may be carried out at different levels depending on whether the CU is coded in intra mode, IBC mode or inter mode. For CUs coded with intra mode and IBC mode, the color space transform may be performed at PU level. For CUs coded with inter mode, the color space transform may be performed at CU level. As a result, the inverse color transform may not be invoked until the residuals of the TUs in one PU or CU are reconstructed.

Inverse CCP and inverse ACT may be performed at TU level. The prediction residuals of a TU can be converted to the original color space without waiting for the reconstruction of the luma and chroma residuals of the entire PU or CU. For example, in de-quantization, multiple TU's may be processed via independent parallel processing paths. A first parallel processing path may perform de-quantization, inverse transform, inverse CCP and, if indicated by TU level signaling for the first TU, inverse ACT for the first TU. A second and independent parallel processing path may perform de-quantization, inverse transform, inverse CCP, and if indicated by TU level signaling for the second TU, inverse ACT for the second TU. The two processing paths may be independent from each other and may be performed in parallel.

The inverse CCP and inverse ACT modules may be defined as two separate decoding processes. The inverse CCP and inverse ACT transform may be performed in a combined decoding process. Performing the inverse ACT at TU level and the combined CCP+ACT decoding process can be applied with or without TU-level ACT enabling/disabling.

TU-based inverse color transform may be performed. Inverse color transform may be carried out at different levels. For CUs coded with intra mode and IBC mode, inverse color transform may be performed at PU level. For CUs coded with inter mode, the color space transform may be performed at CU level. The inverse CCP may be performed as a TU-level operation.

Figure 5A:
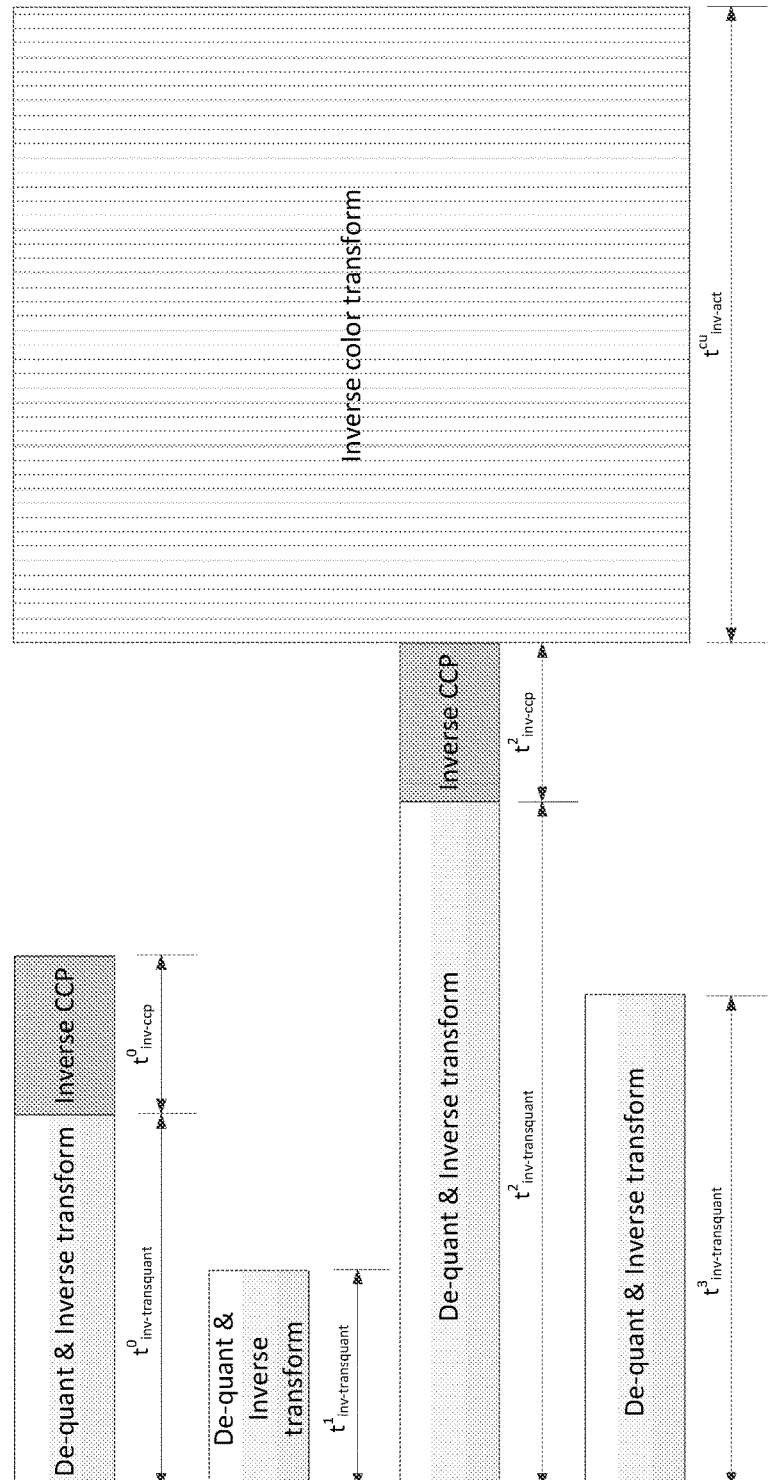
FIG. 5A is a timing diagram of an example decoding process applying inverse CCP at the TU-level and applying inverse ACT at the CU-level.
Figure 5B:
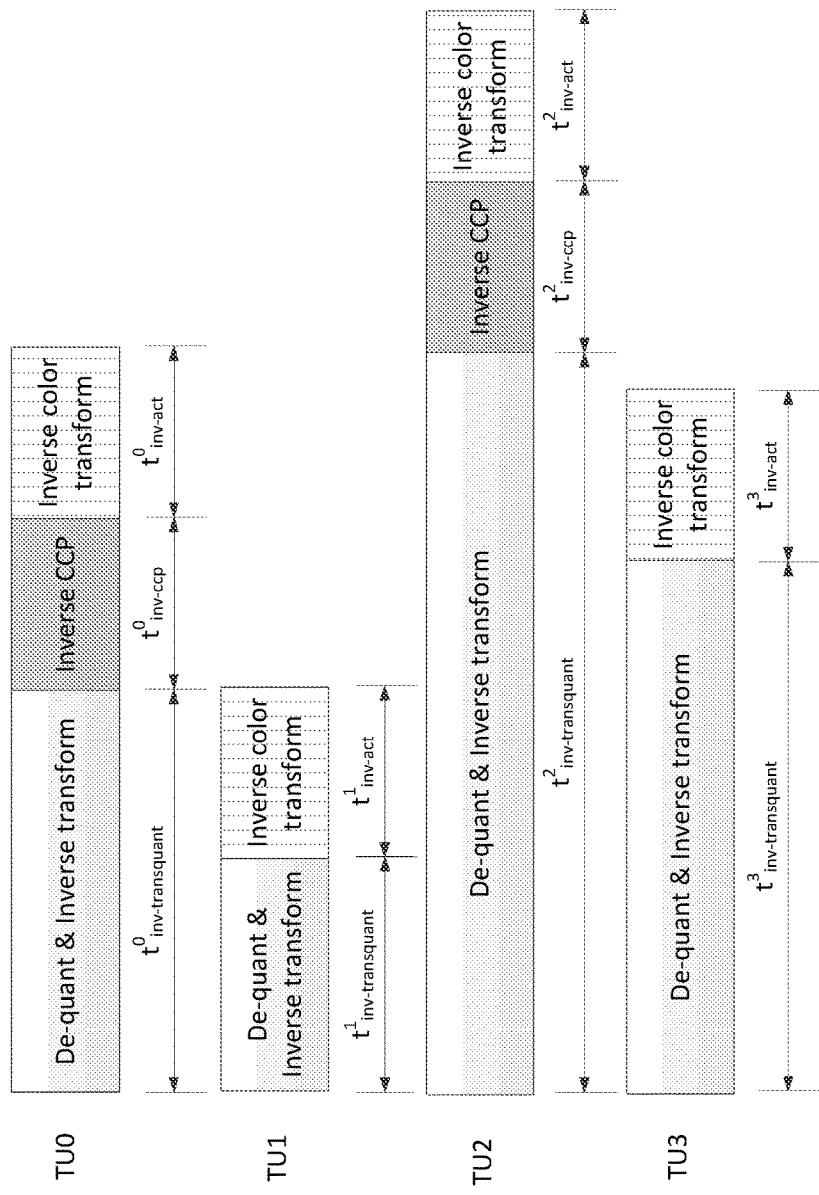
FIG. 5B is a timing diagram of an example residual decoding process applying both inverse CCP and inverse ACT at the TU-level.

FIGS. 5A and 5B visually explain the impact on parallel coding of executing the inverse color transform at different levels. FIG. 5A is a timing diagram of an example decoding process applying inverse CCP at the TU-level and applying inverse ACT at the CU-level. FIG. 5A illustrates the decoding process of a residual signal in one CU when both CCP and ACT are applied. For simplified explanation, assume the CU is partitioned into four TUs, i.e., $TU^0$, $TU^1$, $TU^2$ and $TU^3$, each having the same size. Also, assume the inverse CCP is applied to $TU^0$ and $TU^2$, but not to $TU^1$ and $TU^3$.

In FIG. 5A, the blocks represent the decoding time of de-quantization and inverse transform, inverse CCP and inverse color transform. The variables $t^i_{inv-transquant}$ and $t^i_{inv-ccp}$ are the decoding time of de-quantization and inverse transform module and inverse CCP module for the i-th TU, respectively, and $t^{cu}_{inv-act}$ is the decoding time for the inverse color transform of the entire CU. Since both inverse CCP and inverse color transform are pixel-wise operations, the corresponding decoding time is roughly proportional to the number of pixels in that TU.

As shown in FIG. 5A, because the inverse CCP and inverse color transform are operated at different levels, the inverse color transform is started after the inverse CCP of the TUs with CCP enabled are finished. For example, although $TU^1$ has the smallest residual reconstruction time, its residuals may not be converted back to the original color space before the residuals of $TU^2$ are reconstructed. The total time for residual decoding of the CU in FIG. 5A is equal to Eq. 7.

$$\arg\max_i(t^i_{inv-transquant} + t^i_{inv-ccp}) + t^{cu}_{inv-act} = \qquad \text{Eq. 7}$$

$$t^2_{inv-transquant} + t^2_{inv-ccp} + t^{cu}_{inv-act}.$$

The inverse color transform may be performed at the TU level. The prediction residuals of a TU may be converted back to the original color space without waiting for reconstruction of luma and chroma residuals of the entire CU.

FIG. 5B is a timing diagram of an example residual decoding process applying both inverse CCP and inverse ACT at the TU-level. FIG. 5B illustrates the decoding process of a residual signal in one CU when both CCP and ACT are applied. The same assumptions for FIG. 5A are applicable to FIG. 5B. In FIG. 5B, the blocks represent the decoding time of de-quantization & inverse transform, inverse CCP and inverse color transform, where $t^i_{inv-act}$ is the decoding time of the inverse color transform for the i-th TU. $t^i_{inv-act}$ is roughly equal to $t^{cu}_{inv-act}/4$ given that each TU in the figure is one quarter of the size of the CU.

As illustrated in FIG. 5B, the residuals of a TU may be transformed from YCgCo space to the original color space immediately after the inverse CCP. The corresponding total time of residual decoding may be calculated according to Eq. 8.

$$\arg\max_i(t^i_{inv-transquant} + t^i_{inv-ccp} + t^i_{inv-act}) = \qquad \text{Eq. 8}$$

$$t^2_{inv-transquant} + t^2_{inv-ccp} + t^2_{inv-act}.$$

Inverse CCP and inverse ACT transform may be performed as a combined decoding process. For example, ACT and CCP may be carried out in residual domain, and may be performed by a combined decoding module.

As shown in Eq. 4, the inverse CCP may be written as a linear operation, which can be translated into matrix multiplication, such as in Eq. 9.

$$\begin{bmatrix} Y \\ C_g \\ C_o \end{bmatrix} = \begin{bmatrix} 8 & 0 & 0 \\ \beta_{C_g} & 8 & 0 \\ \beta_{C_o} & 0 & 8 \end{bmatrix} \begin{bmatrix} Y' \\ C'_g \\ C'_o \end{bmatrix} / 8 \qquad \text{Eq. 9}$$

In Eq. 9, Y', $C'_g$ and $C'_o$ may be the residual signal of Y, Cg and Co before inverse CCP. Y, $C_g$ and $C_o$ may be the residual signal of Y, Cg and Co after inverse CCP. $\beta_{C_g}$ and $\beta_{C_o}$ may be the CCP parameters of Cg and Co, respectively.

For lossy coding, given that both inverse CCP in Eq. 9 and inverse ACT in Eq. 5 are linear operations, the inverse CCP and inverse ACT processes may be combined by multiplication, as indicated in Eq. 10.

$$\begin{bmatrix} G \\ B \\ R \end{bmatrix} = \begin{bmatrix} 1 & 1 & 0 \\ 1 & -1 & -1 \\ 1 & -1 & 1 \end{bmatrix} \begin{bmatrix} Y \\ C_g \\ C_o \end{bmatrix} = \begin{bmatrix} 1 & 1 & 0 \\ 1 & -1 & -1 \\ 1 & -1 & 1 \end{bmatrix} \begin{bmatrix} 8 & 0 & 0 \\ \beta_{C_g} & 8 & 0 \\ \beta_{C_o} & 0 & 8 \end{bmatrix} \begin{bmatrix} Y' \\ C'_g \\ C'_o \end{bmatrix} / 8 \quad \text{Eq. 10}$$

$$= \begin{bmatrix} 8+\beta_{C_g} & 8 & 0 \\ 8-(\beta_{C_g}+\beta_{C_o}) & -8 & -8 \\ 8-(\beta_{C_g}-\beta_{C_o}) & -8 & 8 \end{bmatrix} \begin{bmatrix} Y' \\ C'_g \\ C'_o \end{bmatrix} / 8$$

Figure 6A:
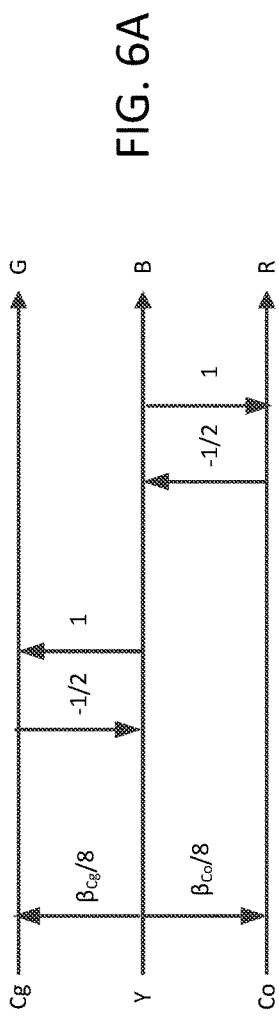
FIG. 6A shows an example concatenation of CCP and ACT operations.

For lossless coding, given the lifting based inverse ACT in Eq. 6, the combined decoding process of CCP and ACT may be derived by concatenating the two operations, as shown in FIG. 6A.

Figure 6B:
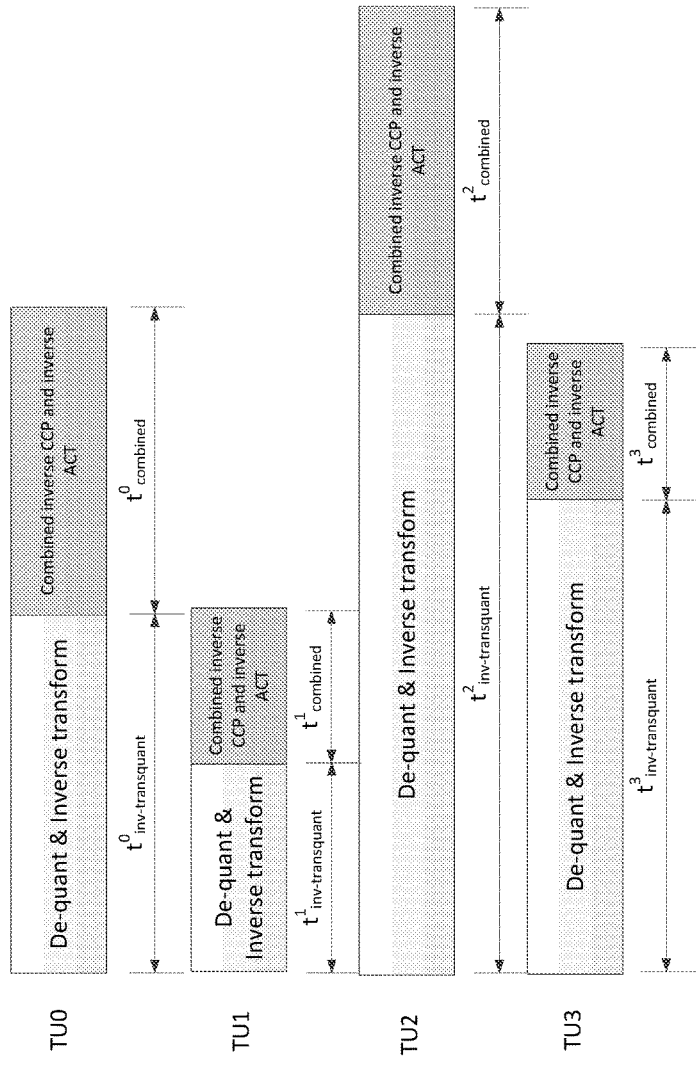
FIG. 6B shows an example residual decoding process combining the inverse CCP and inverse ACT at the TU-level.

FIG. 6B shows an example residual decoding process combining the inverse CCP and inverse ACT at the TU-level. FIG. 6B illustrates the decoding process shown in FIG. 5B where the inverse CCP and inverse ACT are combined into one combined decoding module. As shown in FIG. 6B, the decoding process for a TU may include a de-quantization and inverse transform process and a combined inverse CCP and ACT process. As shown, for $TU^0$, it may take $t^0_{inv-transquant}$ to perform the de-quantization and inverse transform process, and $t^0_{combined}$ to perform the combined inverse CCP and ACT process. For $TU^2$, it may take $t^2_{inv-transquant}$ to perform the de-quantization and inverse transform process, and $t^2_{combined}$ to perform the combined inverse CCP and ACT process. The decoding latency may be reduced as compared to the example residual decoding process that uses the three modules shown in FIG. 5B.

The combined module of inverse CCP and ACT may perform inverse ACT with inverse CCP turned off. For example, as shown in FIG. 5B, $TU^1$ and $TU^3$ utilize the inverse ACT, but not the inverse CCP. A decoding process may be implemented using the combined module by setting corresponding CCP parameters $\beta_{C_g}$ and $\beta_{C_o}$ in Eq. 10 to zero. Given that combined module may be utilized to accomplish inverse ACT alone as well as inverse ACT combined with CCP, a decoder may include a combined module without implementing a separate inverse-ACT-only module.

There may be disparate dynamic ranges of the three color components after color space transform. The dynamic ranges of the three color components may no longer be identical after color space transform. As shown in Eq. 1 and 2 and Table 1, the value of α is limited to the range [−1, 1]. The luma component and the chroma components may or may not have the same dynamic range. As shown in Eq. 5 and 6, the forward color transforms used in lossy coding and lossless coding may not be normalized. The magnitudes of three components (Y, Cg and Co) may be changed by different scaling factors.

The allowed ranges of the weighting parameter for adaptive cross-component prediction may be dynamically adjusted. The allowed ranges of α may be adjusted separately for the two chroma components when the CCP is enabled together with ACT. The allowed ranges of $\alpha_{C_g}$ and $\alpha_{C_o}$ may be adjusted to permit them to have different ranges.

For example, the allowed ranges of parameter α in in Eq. 1 and Eq. 2 may be adjusted separately for the two chroma components when the CCP is enabled together with ACT. The allowed ranges of the weighting parameter for Cg component, $\alpha_{C_g}$, and the allowed ranges of the weighting parameter for Co, $\alpha_{C_o}$, may be adjusted. The weighting parameters for the Cg and Co components may have different ranges.

As shown in Eq. 1 and 2, the value of α may be limited to the range [−1, 1]. The luma and chroma components have the same dynamic range. The rows of the forward color transform matrix in Eq. 5 may show different norms, and the dynamic range of α derived in YCgCo space may become different from that of the original color space. The allowed ranges of α values of the Cg and Co components in YCgCo color space may be adjusted based on the dynamic range differences between the components.

As shown in Eq. 5, for lossy coding the norms of three rows in the forward color transform matrix may be given by Eq. 11.

$$N_Y = \sqrt{6}/4, \ N_{cg} = \sqrt{6}/4, \ N_{co} = \sqrt{8}/4 \quad \text{Eq. 11}$$

Considering Eq. 11, the magnitude ratio between each chroma component and luma component in the YCgCo space may be derived as shown in Eq. 12.

$$\frac{N_{cg}}{N_Y} = 1 \quad \text{Eq. 12}$$

$$\frac{N_{co}}{N_Y} = \frac{\sqrt{8}}{\sqrt{6}} \approx 1.15$$

Given that the relative magnitude ratio between Cg and Y is 1, the range [−1, 1] may be used to limit α values for the Cg component. For the Co component, given that the magnitude of its signal may be larger than that of the Y component after ACT, the range of its α values may be adjusted to [−1.15, 1.15]. The allowed range may be determined based on the relative magnitude ratio between the Co component and the Y component (e.g., as indicated in Eq. 12).

Figure 7:
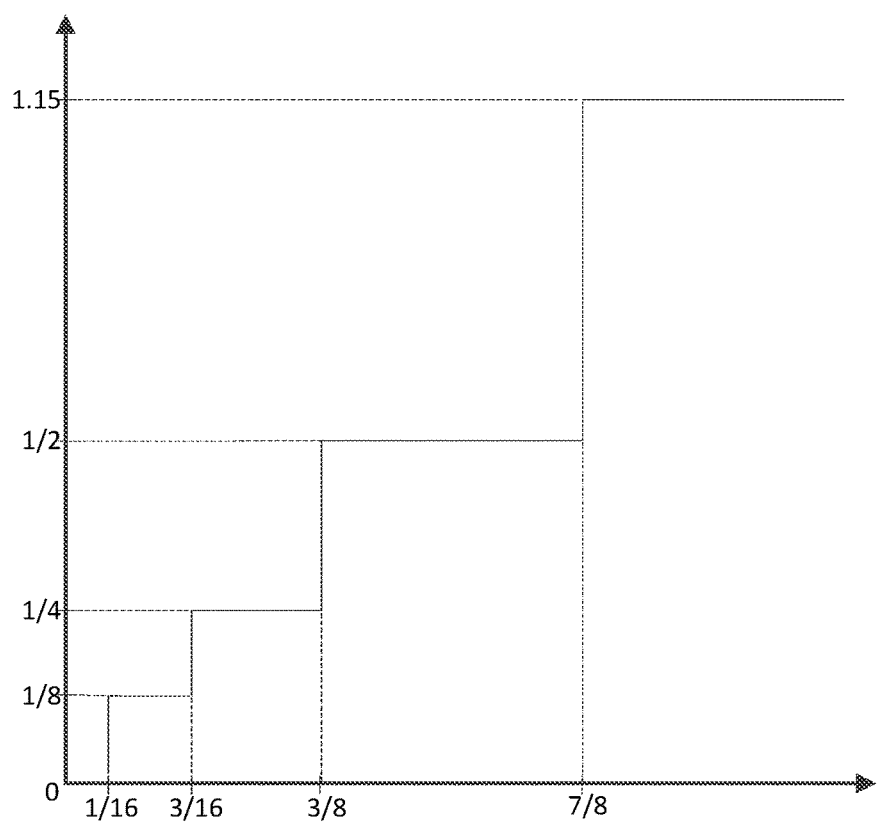
FIG. 7 shows an example encoder-side quantization of the CCP parameters for the Co component in lossy coding.

An encoder may quantize α values of the Co component following application of range adjustment. FIG. 7 shows an example encoder-side quantization of the Co component in lossy coding. Table 4 shows a non-limiting example mapping between original α values and reconstruction values for the Co component using the quantization example shown in FIG. 7.

TABLE 4

Mapping original and reconstruction α values for Co component in lossy coding

| Original value range | Reconstruction value | Original value range | Reconstruction value |
|---|---|---|---|
| (−∞, −7/8] | −1.15 | [7/8, +∞) | 1.15 |
| (−7/8, −3/8] | −1/2 | [3/8, 7/8) | 1/2 |
| (−3/8, −3/16] | −1/4 | [3/16, 3/8) | 1/4 |
| (−3/16, −1/16] | −1/8 | [1/16, 3/16) | 1/8 |
| (−1/16, 1/16) | 0 | | |

With regard to forward and inverse CCP, real α values −1.15 and 1.15 may be approximated by multiplying an integer scaling and right shift. For example, using 5-bit fixed point approximation, when α is −1.15 or 1.15, Eq. 3 and 4 become Eq. 13 and 14.

$$\Delta r_C(x,y) = r_C(x,y) - (37 \times r'_L(x,y)) \gg 5 \qquad \text{Eq. 13}$$

$$r'_C(x,y) = \Delta r'_C(x,y) + (37 \times r'_L(x,y)) \gg 5 \qquad \text{Eq. 14}$$

In an example, consistent with 3-bit precision of fixed point approximation, real α values −1.15 and 1.15 may be approximated by multiplying the scaling of 9 followed by 3-bit right shift, as given by Eq. 15 and 16.

$$\Delta r_C(x,y) = r_C(x,y) - (9 \times r'_L(x,y)) \gg 3 \qquad \text{Eq. 15}$$

$$r'_C(x,y) = \Delta r'_C(x,y) + (9 \times r'_L(x,y)) \gg 3 \qquad \text{Eq. 16}$$

For lossless coding, after translating the lifting operation of the forward color transform in Eq. 6 into matrix operation, the magnitude ratios between chroma components and the luma component in the YCgCo space may be derived as shown in Eq. 17.

$$\frac{N_{cg}}{N_Y} = 2 \qquad \text{Eq. 17}$$

$$\frac{N_{co}}{N_Y} = \frac{4}{\sqrt{3}} \approx 2.3$$

For the Co component in lossy coding, the allowed ranges of α values for the Cg and Co components may be adjusted, respectively, to [−2, 2] and [−2.3, 2.3] in lossless coding.

Figure 8A:
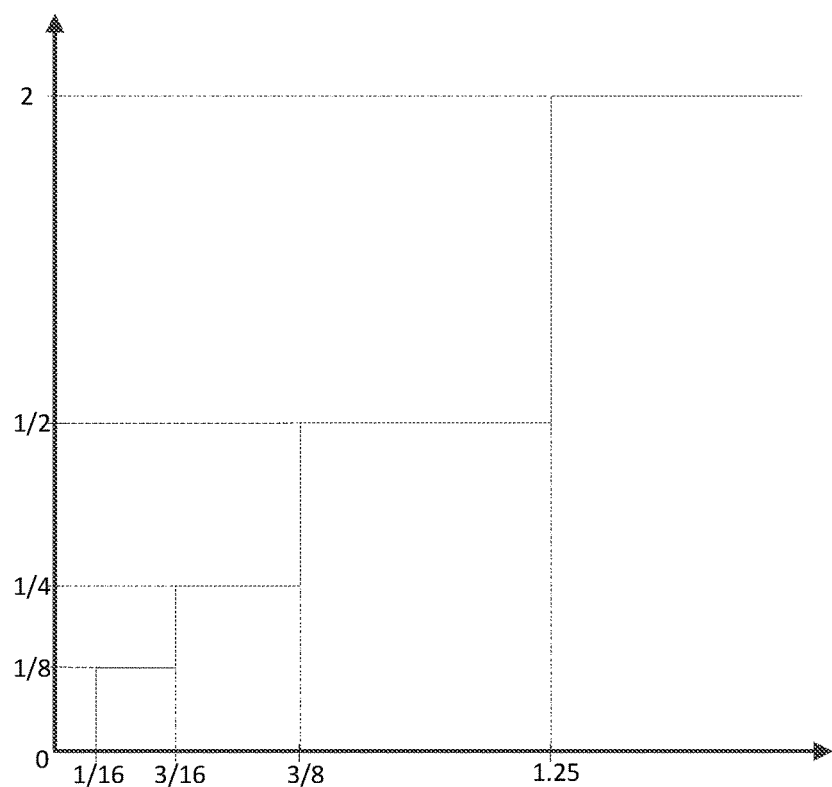
FIG. 8A shows an example encoder-side quantization of the CCP parameters for the Cg component in lossless coding.
Figure 8B:
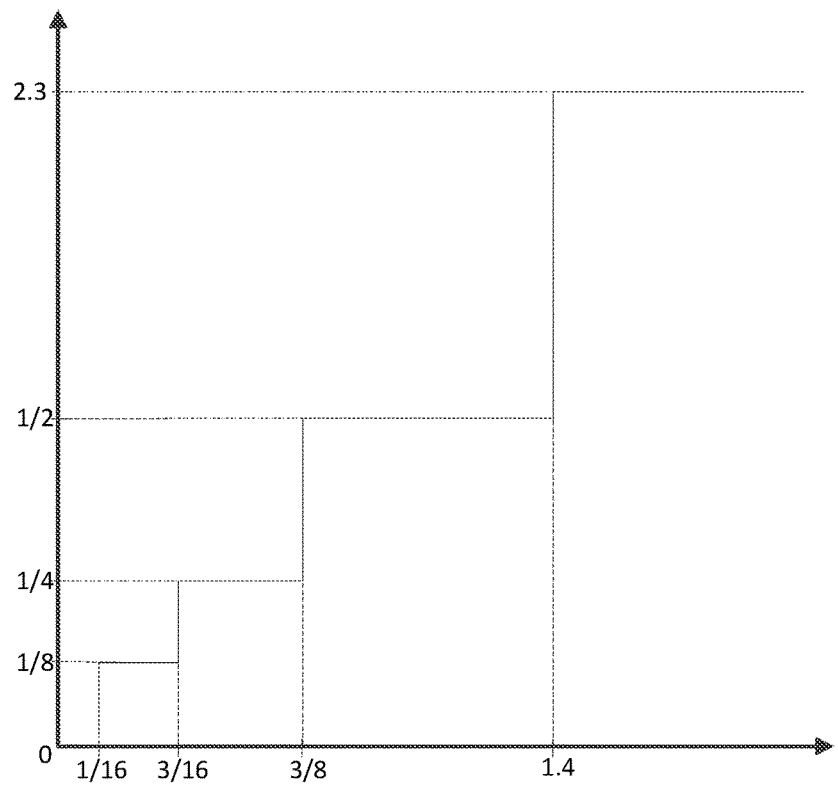
FIG. 8B shows an example encoder-side quantization of the CCP parameters for the Co component in lossless coding.

FIGS. 8A and 8B illustrate example encoder-side quantization used for quantizing α values of Cg and Co components with range adjustment. FIG. 8A shows example quantization of the Cg component in lossless coding. FIG. 8B shows example quantization of the Co component in lossless coding.

Table 5 shows a non-limiting example mapping between original α values and reconstruction values for Cg component using the quantization methods in FIG. 8A for lossless coding.

TABLE 5

Mapping original and reconstruction α values for Cg component in lossless coding

| Original value range | Reconstruction value | Original value range | Reconstruction value |
|---|---|---|---|
| (−∞, −1.25] | −2 | [1.25, +∞) | 2 |
| (−1.25, −3/8] | −1/2 | [3/8, 1.25) | 1/2 |
| (−3/8, −3/16] | −1/4 | [3/16, 3/8) | 1/4 |
| (−3/16, −1/16] | −1/8 | [1/16, 3/16) | 1/8 |
| (−1/16, 1/16) | 0 | | |

Table 6 shows a non-limiting example mapping between original α values and reconstruction values for Co component using the quantization shown in FIG. 8B for lossless coding.

TABLE 6

Mapping original and reconstruction α values for Co component in lossless coding

| Original value range | Reconstruction value | Original value range | Reconstruction value |
|---|---|---|---|
| (−∞, −1.4] | −2.3 | [1.4, +∞) | 2.3 |
| (−1.4, −3/8] | −1/2 | [3/8, 1.4) | 1/2 |
| (−3/8, −3/16] | −1/4 | [3/16, 3/8) | 1/4 |

TABLE 6-continued

Mapping original and reconstruction α values for Co component in lossless coding

| Original value range | Reconstruction value | Original value range | Reconstruction value |
|---|---|---|---|
| (−3/16, −1/16] | −1/8 | [1/16, 3/16) | 1/8 |
| (−1/16, 1/16) | 0 | | |

According to a lossless coding example shown in FIGS. 8A and 8B and Tables 5 and 6, the range limit [−2, 2] and the quantization process in Table 5 may be applied to α values of the Cg component while the range limit [−2.3, 2.3], and the quantization process in Table 6 may be applied to α values of the Co component.

In a lossless coding example, the range limit [−2, 2] and the quantization process in Table 5 may be applied to the a values of both the Cg component and the Co component.

For lossy coding and for lossless coding, the range of α values for chroma components may be adjusted. The original reconstruction values −1 and 1 may be replaced with boundary values of the adjusted range. For example, the original reconstruction values −1/1 may be replaced by −1.15/1.15 in Table 4, by −2/2 in Table 5 and/or by −2.3/2.3 in Table 6.

The range of α values may be adjusted by adding the boundary values of the adjusted range as additional elements in a list of reconstruction values for CCP. Using the CCP of Cg component in lossless coding as an example, Table 7 illustrates mapping between the original α value and the reconstruction value having an increased number of reconstruction values.

TABLE 7

Mapping increased number of original and reconstruction α values for Cg component in lossless coding

| Original value range | Reconstruction value | Original value range | Reconstruction value |
|---|---|---|---|
| (−∞, −1.5] | −2 | [1.5, +∞) | 2 |
| (−1.5, −3/4] | −1 | [3/4. 1.5) | 1 |
| (−3/4, −3/8] | −1/2 | [3/8, 3/4) | 1/2 |
| (−3/8, −3/16] | −1/4 | [3/16, 3/8) | 1/4 |
| (−3/16, −1/16] | −1/8 | [1/16, 3/16) | 1/8 |
| (−1/16, 1/16) | 0 | | |

A comparison of Table 5 to Table 7 reveals an increased number of reconstruction values. In Table 5, there are nine reconstruction values. In Table 7 there are 11 reconstruction values. Table 7 increases the size of the reconstruction value list to 11 by adding adjusted boundary values −2 and 2 to reconstruction values prior to range adjustment: {1 −½, −¼, −⅛, 0, ⅛, ¼, ½, 1}. The range adjustment with increased value mapping may be used for both the Cg and Co components in lossless coding when the ACT is applied.

The quantization parameter (QP) values used in the YCgCo domain may be set to be different from those used in the original color space, e.g. for keeping the quantization errors in the YCgCo space comparable to those in the original color space. The CCP process may cause the signal magnitude to change.

The QP values used in YCgCo space may be adjusted based on the selected CCP parameters. The adjustments may be made such that the distortion of the residual signal after inverse CCP and inverse color space transform are similar to distortion of the residual signal in YCgCo space.

As shown in Eq. 9, when CCP and ACT are applied, the norm of the combined matrix may not equal to 1. The QP applied to YCgCo color space may be different from QP applied in the original color space. When CCP and ACT are applied, QP adjustment values may be adjusted to consider the signal magnitude change caused by the CCP process.

For example, the QP values used in YCgCo space may be adjusted with consideration of the selected CCP parameters. The norms of the combined matrix may be derived as shown in Eq. 18.

$$N_y = \sqrt{(8+\beta_{C_g})^2 + (8-\beta_{C_g}-\beta_{C_o})^2(8-\beta_{C_g}+\beta_{C_o})^2}/8$$

$$N_{cg} = \sqrt{3}$$

$$N_{co} = \sqrt{2} \quad \text{Eq. 18}$$

A quantization step size is given by Eq. 19.

$$Q_{step} = 2^{(QP-4)/6} \quad \text{Eq. 19}$$

Quantization error relates to $Q_{step}^2$. Distortion of the signal in the original color space (e.g., after conversion back from the YCgCo space) may be at the same level as in the YCgCo signal. QP adjustment values may be given by Eq. 20.

$$2^{(QP_0-4)/3} = \frac{(8+\beta_{C_g})^2 + (8-\beta_{C_g}-\beta_{C_o})^2(8-\beta_{C_g}+\beta_{C_o})^2}{64} \times 2^{(QP_Y-4)/3} \quad \text{Eq. 20}$$

$$2^{(QP_1-4)/3} = 3 \times 2^{(QP_{Cg}-4)/3}$$

$$2^{(QP_2-4)/3} = 2 \times 2^{(QP_{Co}-4)/3}$$

In Eq. 20, $QP_0$, $QP_1$ and $QP_2$ may be the QPs applied to the three components in the original color space. Eq. 21 may be reorganized as shown in Eq. 22.

$$QP_Y = QP_0 - \Delta QP_Y = QP_0 - \quad \text{Eq. 21}$$

$$3 \times \log_2 \left( \frac{(8+\beta_{C_g})^2 + (8-\beta_{C_g}-\beta_{C_o})^2(8-\beta_{C_g}+\beta_{C_o})^2}{64} \right)$$

$$QP_{Cg} = QP_1 - 3 \times \log_2 3 \approx QP_1 - 5$$

$$QP_{Co} = QP_2 - 3 \times \log_2 2 \approx QP_2 - 3$$

An example of QP adjustment is provided with reference to a previous example shown in Table 4, which maps original and reconstruction values for the Co component in lossy coding. In the previous example, a CCP range adjustment where the range limits [−1, 1] and [−1.15, 1.15] may be applied, respectively, to the CCP parameters of the Cg and Co components. Table 8 shows a corresponding QP adjustment $\Delta QP_Y$ for the Y component depending on the values of $\beta_{C_o}$ with CCP parameter range adjustment. $\beta_{C_o}$ may represent the CCP parameter of the Co component. $\beta_{C_g}$ may represent the CCP parameter of the Cg component.

TABLE 8

Luma QP adjustment $\Delta QP_Y$ in YCgCo color space using different CCP parameters $\beta_{C_o}$ with range adjustment of CCP parameters applied to Co component

| | $\beta_{C_o}$ | | | | | | | | |
|---|---|---|---|---|---|---|---|---|---|
| $\beta_{C_g}$ | −9 | −4 | −2 | −1 | 0 | 1 | 2 | 4 | 9 |
| −8 | −10 | −9 | −9 | −9 | −9 | −9 | −9 | −9 | −10 |
| −4 | −9 | −7 | −7 | −7 | −7 | −7 | −7 | −7 | −9 |
| −2 | −8 | −6 | −6 | −6 | −6 | −6 | −6 | −6 | −8 |
| −1 | −8 | −6 | −5 | −5 | −5 | −5 | −5 | −6 | −8 |
| 0 | −7 | −5 | −5 | −5 | −5 | −5 | −5 | −5 | −7 |
| 1 | −7 | −5 | −5 | −4 | −4 | −4 | −5 | −5 | −7 |
| 2 | −7 | −5 | −4 | −4 | −4 | −4 | −4 | −5 | −7 |
| 4 | −7 | −5 | −5 | −4 | −4 | −4 | −5 | −5 | −7 |
| 8 | −8 | −7 | −6 | −6 | −6 | −6 | −6 | −7 | −8 |

CCP may be applied without range adjustment. For example, the CCP parameter for the Cg component may not be adjusted, remaining at [−1, 1], and/or a range adjustment process may not be applied. Table 9 presents an example luma QP adjustment $\Delta QP_Y$ in YCgCo color space using different CCP parameters $\beta_{C_g}$ and $\beta_{C_o}$ without application of range adjustment of CPP. The values of both $\beta_{C_g}$ and $\beta_{C_o}$ may be chosen from {−8, −4, −2, −1, 0, 1, 2, 4, 8}. Table 9 shows the corresponding QP adjustment $\Delta QP_Y$ for the Y component based on the values of $\beta_{C_g}$ and $\beta_{C_o}$.

TABLE 9

Luma QP adjustment $\Delta QP_Y$ in YCgCo color space using different CCP parameters $\beta_{C_g}$ and $\beta_{C_o}$ without application of range adjustment of CPP

| | $\beta_{C_o}$ | | | | | | | | |
|---|---|---|---|---|---|---|---|---|---|
| $\beta_{C_g}$ | −8 | −4 | −2 | −1 | 0 | 1 | 2 | 4 | 8 |
| −8 | −10 | −9 | −9 | −9 | −9 | −9 | −9 | −9 | −10 |
| −4 | −8 | −7 | −7 | −7 | −7 | −7 | −7 | −7 | −8 |
| −2 | −8 | −6 | −6 | −6 | −6 | −6 | −6 | −6 | −8 |
| −1 | −7 | −6 | −5 | −5 | −5 | −5 | −5 | −6 | −7 |
| 0 | −7 | −5 | −5 | −5 | −5 | −5 | −5 | −5 | −7 |
| 1 | −7 | −5 | −5 | −4 | −4 | −4 | −5 | −5 | −7 |
| 2 | −7 | −5 | −4 | −4 | −4 | −4 | −4 | −5 | −7 |
| 4 | −7 | −5 | −5 | −4 | −4 | −4 | −5 | −5 | −7 |
| 8 | −8 | −7 | −6 | −6 | −6 | −6 | −6 | −7 | −8 |

QP adjustment values listed in Table 8 and Table 9 may be applicable to lossy coding. QP adjustment may be skipped for lossless coding if quantization is not applied.

In the ACT, the bit depths of chroma components may be different than the bit depth(s) of luma components. The bit depth of a chroma component may be denoted as $BitDepth_C$. The bit depth of a luma component may be denoted as $BitDepth_Y$ herein.

ACT may be skipped when $BitDepth_Y$ and $BitDepth_C$ are different. The ACT tool may be configured to be disabled, e.g., by high level signaling. For example, a flag residual_adaptive_colour_transform_enabled_flag may be set to 0 in sequence parameter set (SPS) when $BitDepth_Y$ and $BitDepth_C$ are different.

The bit depths of the luma component and the chroma components may be aligned, e.g., by scaling the component with smaller/lower bit depth to match the bit depth of the other component through left bit shift before inverse color transform. For example, the bit depth of the luma component may be adjusted based on a bit depth difference between the bit depths of the luma component and the chroma components. For example, the bit depth of the chroma component may be adjusted based on a bit depth difference between the bit depths of the luma component and the chroma components. The scaled component may be readjusted and/or rescaled to its original bit depth through right bit shift after the inverse color transform.

Figure 9:
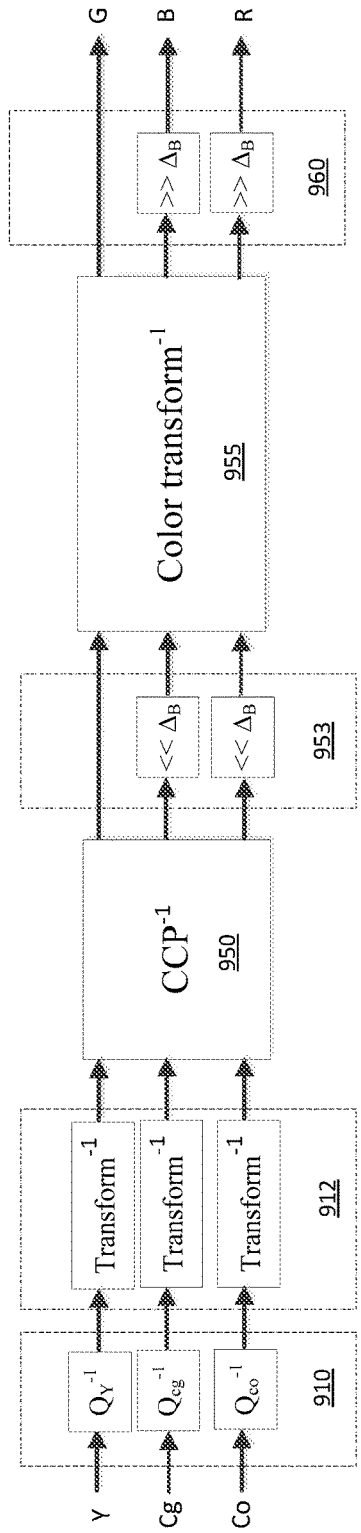
FIG. 9 shows an example decoding process applying inverse ACT with bit depth alignment when bit depths of luma and chroma are different in lossy coding.

FIG. 9 shows an example decoding process applying inverse ACT with bit depth alignment when bit depths of luma and chroma are different in lossy coding. As shown in FIG. 9, inverse quantization 910 and inverse transform 912 may be performed on the residual coefficients, such as luma component Y and the chroma components Cg and Co, respectively. The residual coefficients may be provided to the inverse CCP 950. After inverse cross-component prediction is performed, the bit depths of the luma component and the chroma components may be aligned at 953.

Whether the bit depths of luma and chroma components are different may be determined. On a condition that the bit depths of luma and chroma components are different, a bit depth alignment operation may be performed. A bit depth difference between the bit depths of the luma component and the chroma components may be determined Left bit shift(s) may be applied to one or more components with lower bit depth by the bit depth difference. For example, variable delta bit depth may represent the depth difference. When BitDepth$_Y$ is greater than BitDepth$_C$, the delta bit depth variable may be set as $\Delta_B$=BitDepth$_Y$−BitDepth$_C$. The coefficients for chroma components may be left shifted by a value of the delta bit depth. When BitDepth$_Y$ is less than BitDepth$_C$, the delta bit depth variable may be set as $\Delta_B$=BitDepth$_C$−BitDepth$_Y$. The coefficients for luma component may be left shifted by a value of the delta bit depth.

As shown in FIG. 9, left bit shifts may are applied to chroma components by $\Delta_B$. The residual coefficients may be converted back to the original color space by the inverse color transform operations 955. At 960, the scaled components such as the chroma components may be readjusted and/or rescaled to their original bit depth through right bit shift as shown in FIG. 9.

Bit depth alignment may include bit shifting. As shown in FIG. 9, left bit shifts may be applied to chroma components. In other examples, left bit shifts may be applied to the luma component (e.g., when BitDepth$_Y$ is less than BitDepth$_C$). Decoding processes such as inverse transform and/or inverse CCP of the chroma components may operate at the original internal bit depth such as BitDepth$_C$.

Equation 23 shows an example inverse color transform with bit shift operations by matrix multiplications to align bit depth.

$$\begin{bmatrix} G \\ B \\ R \end{bmatrix} = \text{round}\left(\begin{bmatrix} 1 & 0 & 0 \\ 0 & 2^{-\Delta_B} & 0 \\ 0 & 0 & 2^{-\Delta_B} \end{bmatrix}\begin{bmatrix} 1 & 1 & 0 \\ 1 & -1 & -1 \\ 1 & -1 & 1 \end{bmatrix}\begin{bmatrix} 1 & 0 & 0 \\ 0 & 2^{\Delta_B} & 0 \\ 0 & 0 & 2^{\Delta_B} \end{bmatrix}\begin{bmatrix} Y \\ C_g \\ C_o \end{bmatrix}\right) \quad \text{Eq. 23}$$

A bit depth difference between luma and chroma components may be compensated for adjusting the QP of chroma components. For example, if a quantization step size increases $2^{1/6}$ times with each increment of QP and doubles for every 6 increments, increasing QP by $6\Delta_B$ may be equivalent to scaling the magnitude of a signal by right shifting by $\Delta_B$ bits. A QP adjustment of $6\Delta_B$ may be applied to the chroma components. The input signal to the inverse color transform may have the same bit depth for its luma and chroma components.

Figure 10:
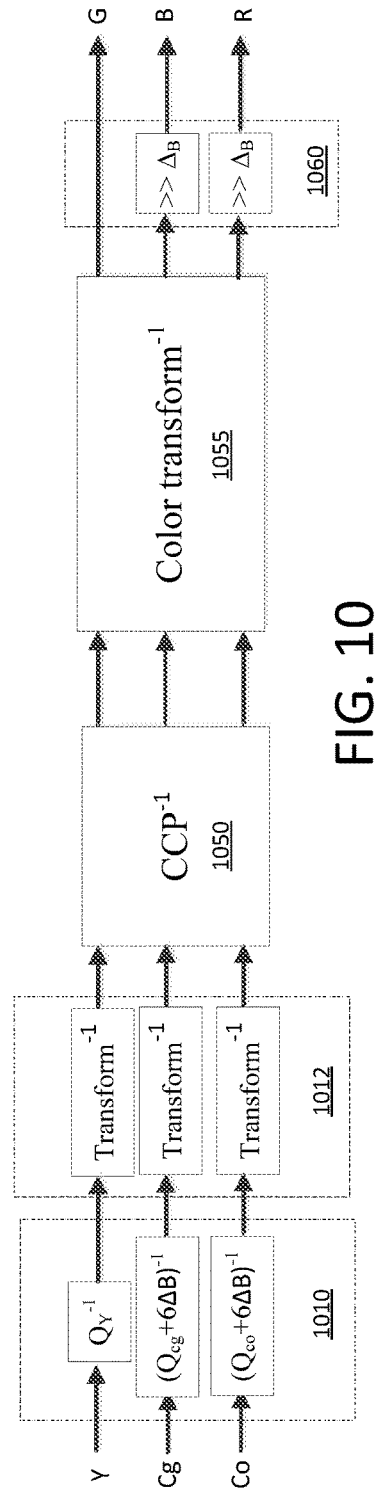
FIG. 10 shows an example decoding process applying inverse ACT with quantization parameter (QP) adjustment when bit depths of luma and chroma are different in lossy coding.

For example, when bit depths of luma and chroma are different in lossy coding, the QP of luma and/or chroma components may be adjusted based on the bit depth difference. FIG. 10 shows an example decoding process applying inverse ACT with QP adjustment. At 1010, the QP of chroma components may be adjusted such that the input signal to inverse CCP 1050 may have the same bit depth for its luma and chroma components. When the bit depth of the luma component is higher than the bit depths of the chroma component(s), chroma inverse transform and inverse color transform may be operated at the luma bit depth. When the bit depth of the luma component is lower than the chroma component(s), chroma inverse transform and inverse color transform may be operated at their original bit depth. As shown in FIG. 10, inverse transform 1012 may be performed on residual coefficients. The residual coefficients may be provided to the inverse CCP 1050. The residual coefficients may be converted back to the original color space by the inverse color transform operations 1055. At 1060, the scaled components such as the chroma components may be readjusted and/or rescaled to their original bit depth through right bit shift as shown in FIG. 10.

Figure 11:
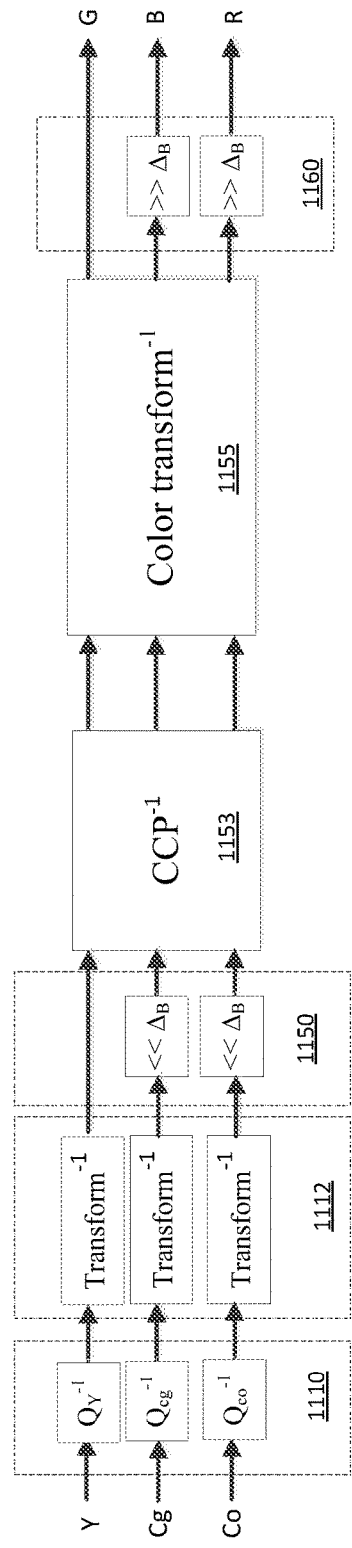
FIG. 11 shows an example decoding process applying inverse ACT with left bit shifts after chroma inverse transform when bit depths of luma and chroma are different in lossy coding.

FIG. 11 shows an example decoding process applying inverse ACT with left bit shifts after chroma inverse transform when bit depths of luma and chroma are different in lossy coding. The inverse transform of the chroma components may use the original lower bit depth. QP adjustments may be skipped.

As shown in FIG. 11, inverse quantization 1110 and inverse transform 1112 may be performed on residual coefficients, such as luma component Y and the chroma components Cg and Co, respectively. Before inverse cross-component prediction 1153 is performed, the bit depths of the luma component and the chroma components may be aligned at 1150. After the bit depths are aligned, inverse CCP 1153 may be performed on the residual coefficients. The residual coefficients may be converted back to the original color space by the inverse color transform operations 1155. At 1160, the scaled components such as the chroma components may be readjusted and/or resealed to their original bit depth through right bit shift as shown in FIG. 11.

Techniques described herein may be combined in any conceivable combination. They may also be combined in any conceivable combination. For example, the combined inverse CCP and ACT, range adjustment of CCP parameters, luma QP adjustment and adjusting the QP of chroma component techniques may be built on the assumption that both inverse CCP and inverse color transform operate at the same bit depth. In this combination, inverse CCP and the inverse color transform may be performed at the higher bit depth of luma and chroma components, e.g., max(BitDepth$_Y$, BitDepth$_C$).

Figure 12:
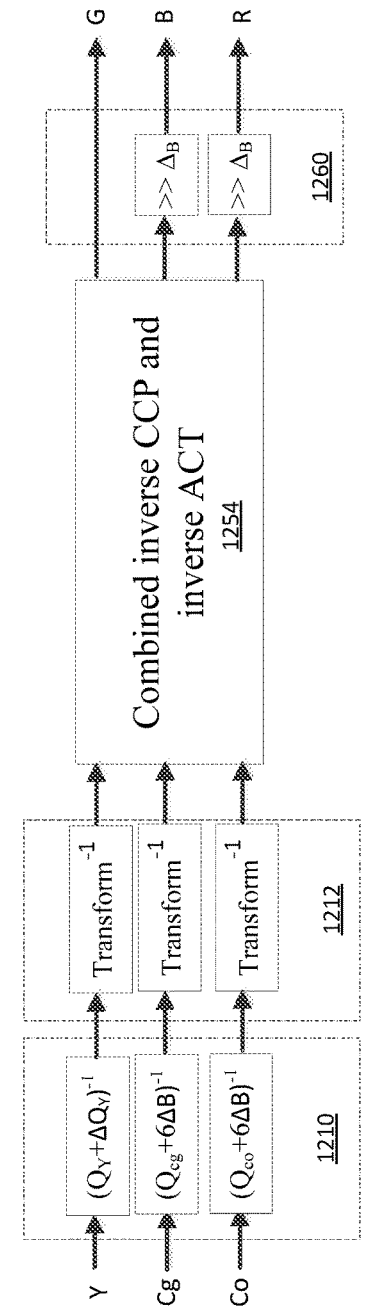
FIG. 12 shows an example decoding process in a combined inverse CCP and inverse ACT when bit depths of luma and chroma are different in lossy coding.

FIG. 12 shows an example decoding process in a combined inverse CCP and inverse ACT. As shown, the decoding process may include a combined inverse CCP and ACT, range adjustment of CCP parameters, luma QP adjustment and adjustment of the QP of chroma component. Substitutions and other combinations are contemplated. For example, although not illustrated, a left bit shift of $\Delta_B$ bits may be applied to the output of the inverse transform for a chroma component.

As shown in FIG. 12, inverse quantization 1210 may be performed on residual coefficients, such as luma component Y and the chroma components Cg and Co, respectively.

Luma QP adjustment and adjustment of the QP of chroma component may be performed as part of the inverse quantization 1210. $\Delta Q_Y$ may represent the delta QP applied to the quantization of luma component in YCgCo space. This may be derived using Table 8 or Table 9 based on the range adjustment of CCP parameters. Inverse transform 1212 may be performed on residual coefficients. Combined inverse CCP and inverse ACT 1254 may be performed. The residual coefficients may be converted back to the original color space. At 1260, the scaled components such as the chroma components may be readjusted and/or resealed to their original bit depth through right bit shift as shown in FIG. 12.

Figure 13A:
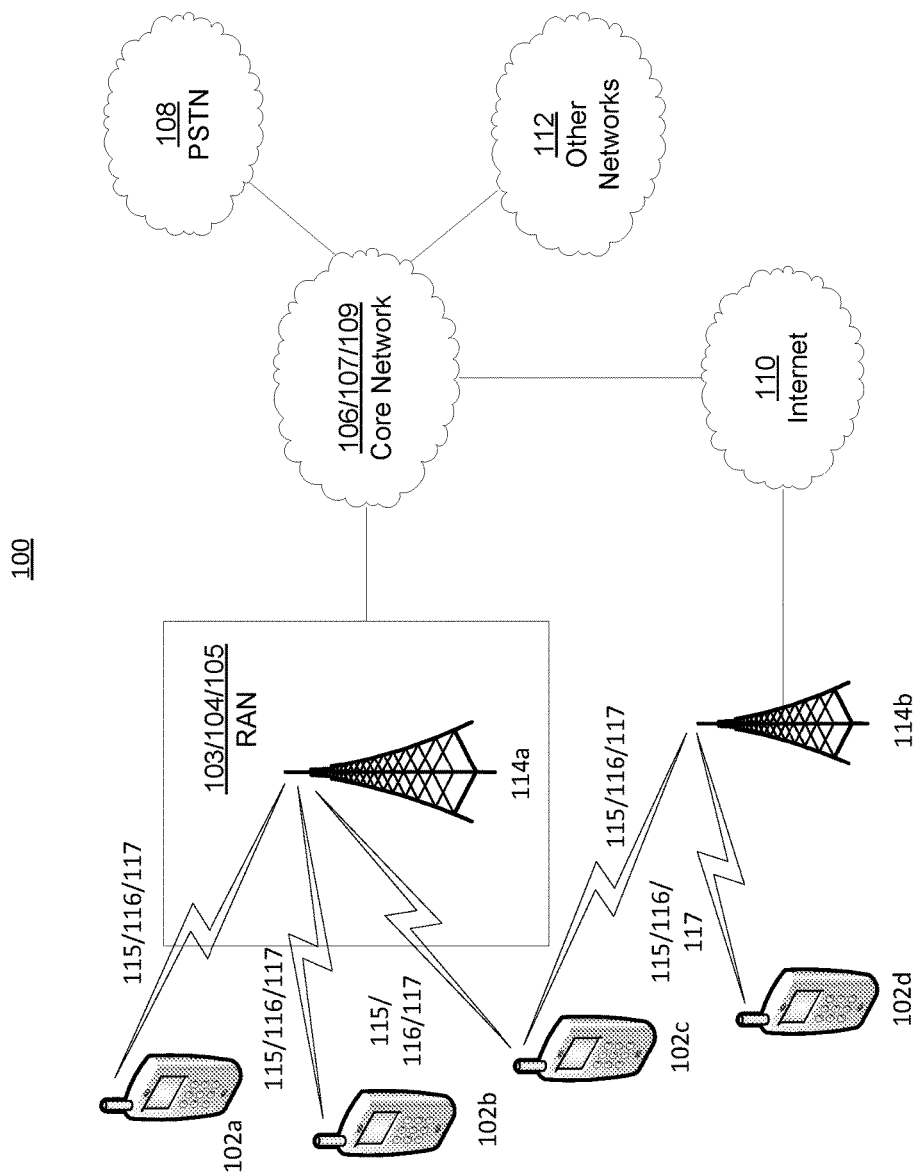
FIG. 13A is a system diagram of an example communications system in which one or more disclosed embodiments may be implemented.

FIG. 13A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

Figure 13B:
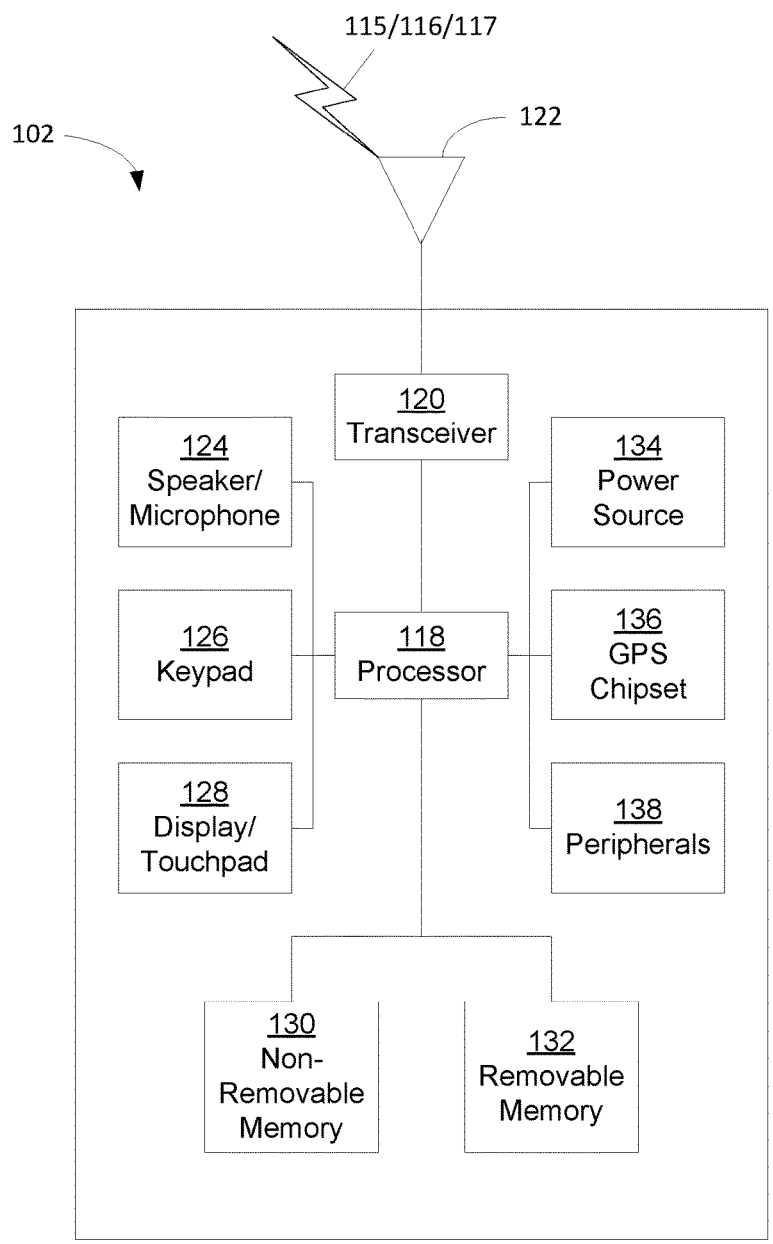
FIG. 13B is a system diagram of an example wireless transmit/receive unit (WTRU) that may be used within the communications system illustrated in FIG. 13A.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
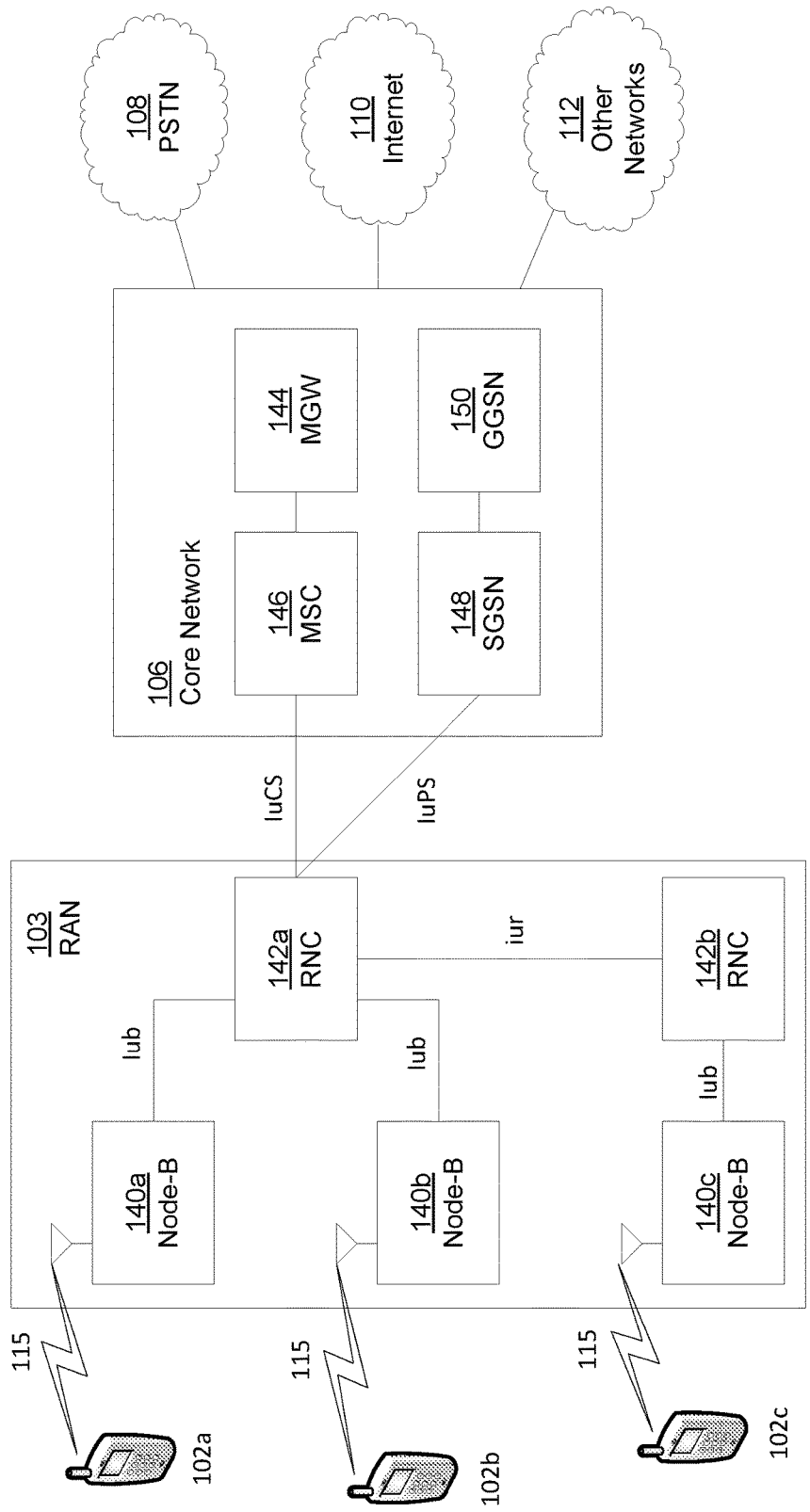
FIG. 13C is a system diagram of an example radio access network and an example core network that may be used within the communications system illustrated in FIG. 13A.

FIG. 13C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
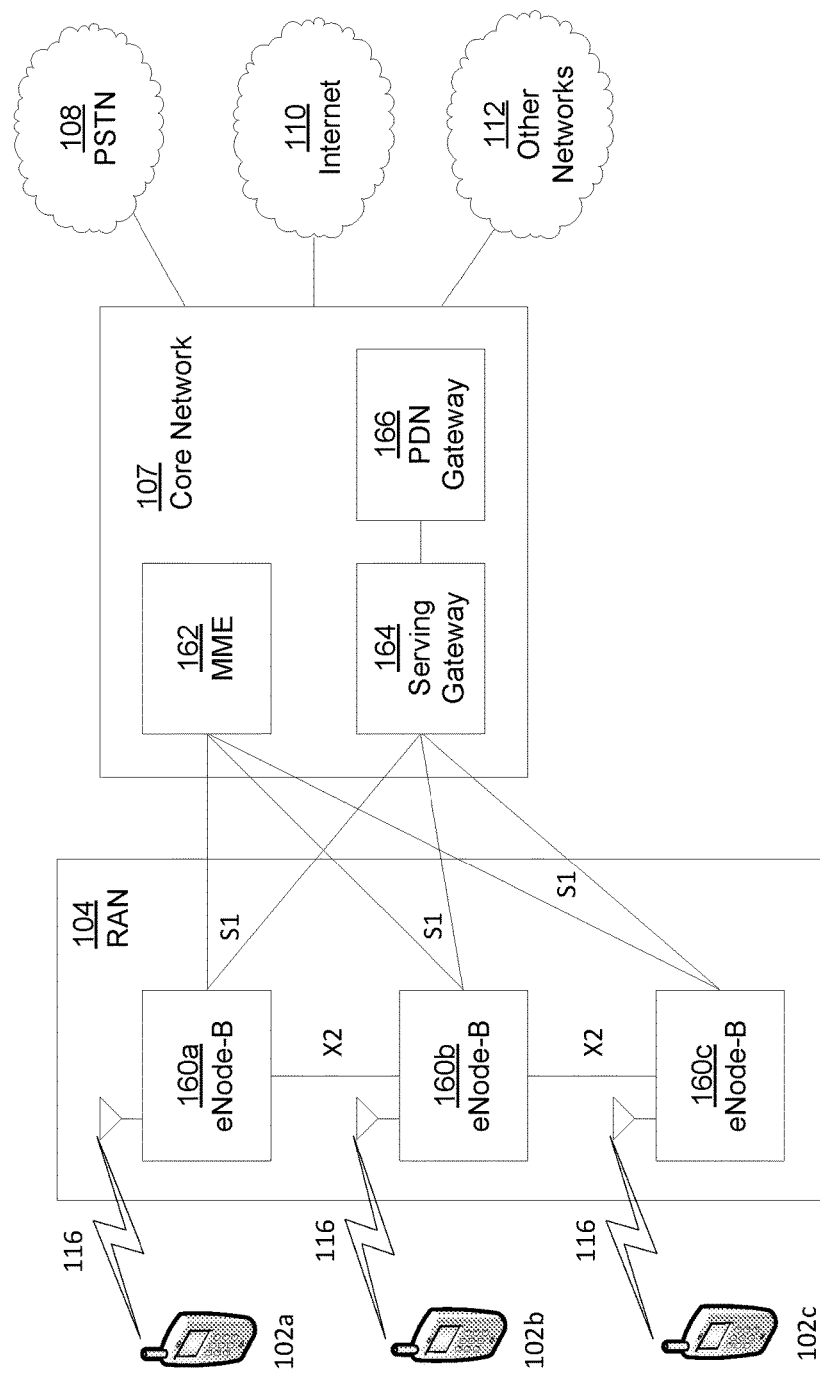
FIG. 13D is a system diagram of another example radio access network and an example core network that may be used within the communications system illustrated in FIG. 13A.

FIG. 13D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
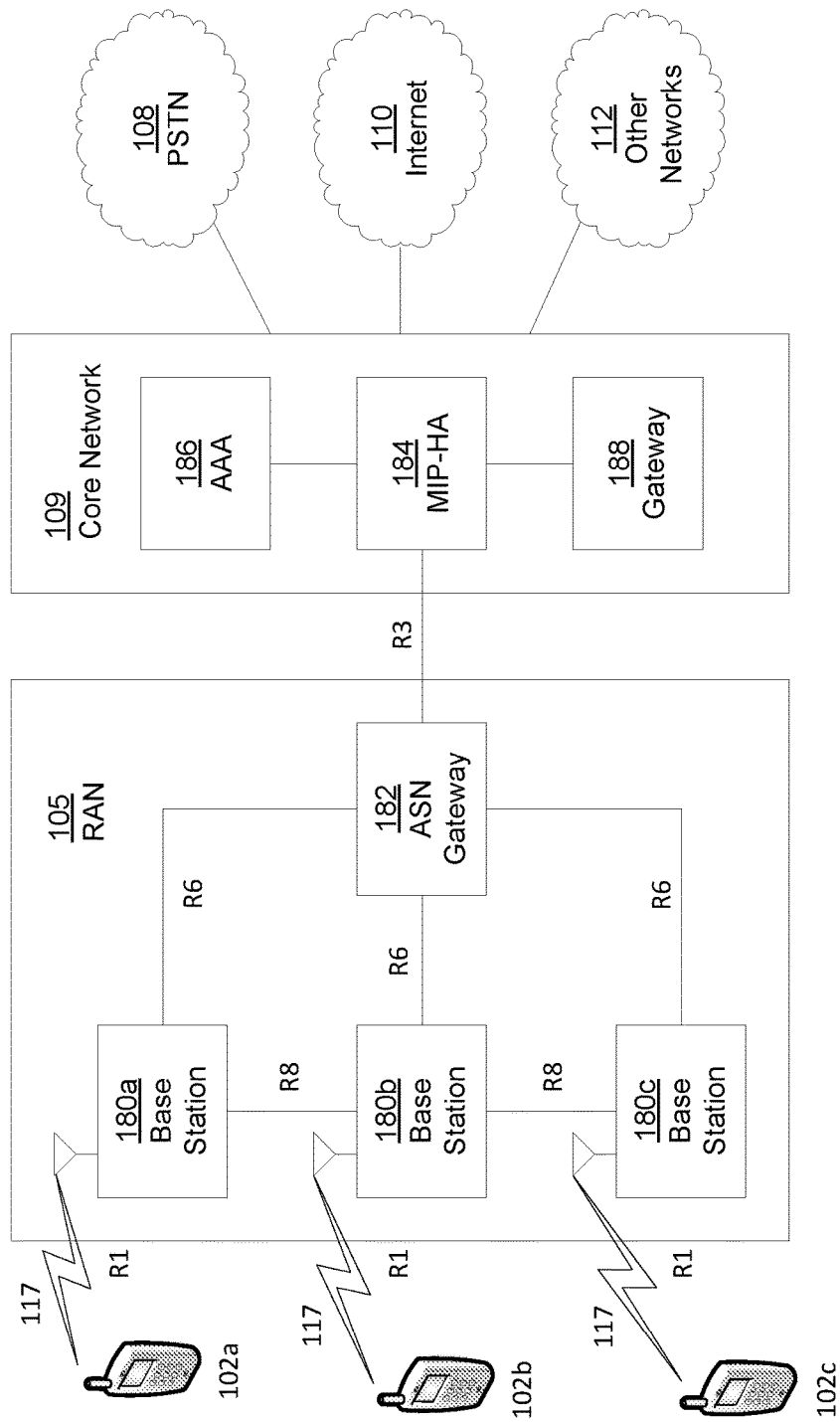
FIG. 13E is a system diagram of another example radio access network and an example core network that may be used within the communications system illustrated in FIG. 13A.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video coding device comprising:
   a processor configured to:
      receive a coding unit (CU) comprising a first transform unit (TU) and a second TU;
      determine that inverse adaptive color transform (ACT) is enabled for the first TU, the first TU comprising a luma component having an original luma component bit depth, a first chroma component and a second chroma component having an original chroma component bit depth;
perform bit depth alignment on the luma component and the first and second chroma components such that the luma component and the first and second chroma components have an aligned bit depth by:
determining a bit depth difference between the original luma component bit depth and the original chroma component bit depth; and
left-shifting coefficients of a component having a lower original bit depth by the bit depth difference;
perform inverse ACT on the first TU based on the luma component and the first and second chroma components having the aligned bit depth; and
after the inverse ACT, right-shift the coefficients of the component having the lower original bit depth by the bit depth difference.

2. The video coding device of claim 1, wherein de-quantization, inverse transform, inverse cross-component prediction (CCP), and inverse ACT is applied for the first TU via a first parallel processing path, and de-quantization, inverse transform and inverse CCP is applied for the second TU via a second parallel processing path, the second parallel processing path being independent from the first parallel processing path.

3. The video coding device of claim 1, wherein the processor is further configured to:
determine whether the residuals of the first TU are coded in a transformed color space or an original color space based on the TU color space indicator associated with the first TU.

4. The video coding device of claim 1, wherein the aligned bit depth is the higher bit depth between the original component luma bit depth and the original chroma component bit depth, and the processor is further configured to:
scale a component having a lower original bit depth to match the aligned bit depth.

5. The video coding device of claim 1, wherein the luma component and the first and second chroma components are associated with a residual transform block.

6. The video coding device of claim 1, wherein the processor is further configured to determine whether inverse ACT is enabled for the second TU, and a second inverse ACT is skipped for the second TU when inverse ACT is not enabled for the second TU.

7. A video coding method comprising:
receiving a coding unit (CU) comprising a first transform unit (TU) and a second TU;
determining that inverse adaptive color transform (ACT) is enabled for the first TU, the first TU comprising a luma component having an original luma component bit depth, a first chroma component and a second chroma component having an original chroma component bit depth;
performing bit depth alignment on the luma component and the first and second chroma components such that the luma component and the first and second chroma components have an aligned bit depth;
performing inverse ACT on the first TU based on the luma component and the first and second chroma components having the aligned bit depth;
after the inverse ACT, reverting the luma component to the original luma component bit depth, or reverting the first and second chroma components to the original chroma component bit depth.

8. The video coding method of claim 7, wherein inverse ACT being enabled for the first TU is determined based on at least one of: a prediction mode, a partition mode or an intra prediction mode associated with the CU that comprises the first TU.

9. The video coding method of claim 7, further comprising determining whether inverse ACT is enabled for the first TU based on a first TU inverse ACT enabled indicator associated with the first TU, and whether inverse ACT is enabled for the second TU based on a second TU inverse ACT enabled indicator associated with the second TU.

10. The video coding method of claim 7, wherein inverse ACT being enabled for the first TU is determined based at least in part on a CU-level TU inverse ACT enabled indicator associated with the CU that comprises the first TU.

11. The video coding method of claim 7, wherein de-quantization, inverse transform, inverse cross-component prediction (CCP), and inverse ACT is applied for the first TU via a first parallel processing path, and de-quantization, inverse transform and inverse CCP is applied for the second TU via a second parallel processing path, the second parallel processing path being independent from the first parallel processing path.

12. The video coding method of claim 7, further comprising:
determining whether the residuals of the first TU are coded in a transformed color space or an original color space based on the TU color space indicator associated with the first TU.

13. The video coding method of claim 7, wherein the aligned bit depth is the higher bit depth between the original luma component bit depth and the original chroma component bit depth, and the method further comprises:
scaling a component having a lower original bit depth to match the aligned bit depth.

14. The video coding method of claim 7, wherein performing bit depth alignment further comprises:
determining a bit depth difference between the original luma component bit depth and the original chroma component bit depth; and
left-shifting coefficients of a component having a lower original bit depth by the bit depth difference.

15. The video coding method of claim 14, wherein reverting the luma component to the original luma component bit depth, or reverting the first and second chroma components to the original chroma component bit depth further comprises:
right-shifting the coefficients of the component having the lower original bit depth by the bit depth difference.

16. The video coding method of claim 7, wherein the luma component and the first and second chroma components are associated with a residual transform block.

* * * * *